*US008117556B2*

US 8,117,556 B2

(12) United States Patent
Eilers

(10) Patent No.: US 8,117,556 B2
(45) Date of Patent: Feb. 14, 2012

(54) TARGET-ALIGNMENT-AND-DROP CONTROL FOR EDITING ELECTRONIC DOCUMENTS

(75) Inventor: Laban D. Eilers, Framingham, MA (US)

(73) Assignee: VistaPrint Technologies Limited, Hamilton (BM)

( * ) Notice: Subject to any disclaimer, the term of this patent is extended or adjusted under 35 U.S.C. 154(b) by 666 days.

(21) Appl. No.: 12/059,604

(22) Filed: Mar. 31, 2008

(65) Prior Publication Data
US 2009/0249239 A1 Oct. 1, 2009

(51) Int. Cl.
*G06F 3/00* (2006.01)

(52) U.S. Cl. ......... 715/769; 715/858
(58) Field of Classification Search .......... 345/629; 715/769, 770, 821–824, 745–747, 856–864, 715/243–247, 765, 254–256, 780
See application file for complete search history.

(56) References Cited

U.S. PATENT DOCUMENTS

| 5,548,702 | A  | * | 8/1996  | Li et al. ............... 715/769 |
| 5,606,674 | A  | * | 2/1997  | Root ................... 715/769 |
| 5,630,080 | A  |   | 5/1997  | Malamud et al. |
| 6,141,007 | A  | * | 10/2000 | Lebling et al. ........ 715/792 |
| 7,624,403 | B2 | * | 11/2009 | Ishimitsu et al. ....... 719/328 |
| 7,840,648 | B1 | * | 11/2010 | Rosenstein et al. ..... 709/218 |
| 2003/0065638 | A1 |   | 4/2003  | Robert |
| 2004/0085368 | A1 |   | 5/2004  | Johnson et al. |
| 2006/0004844 | A1 | * | 1/2006  | Rothschiller et al. .... 707/102 |
| 2006/0069635 | A1 | * | 3/2006  | Ram et al. ............ 705/37 |
| 2006/0161856 | A1 | * | 7/2006  | Heir ................. 715/769 |
| 2007/0067745 | A1 | * | 3/2007  | Choi et al. ........... 715/863 |
| 2007/0128899 | A1 | * | 6/2007  | Mayer ............... 439/152 |
| 2008/0177994 | A1 | * | 7/2008  | Mayer .................. 713/2 |
| 2008/0198175 | A1 | * | 8/2008  | Sun et al. ............ 345/629 |
| 2008/0222548 | A1 | * | 9/2008  | Cohen et al. .......... 715/770 |
| 2009/0019370 | A1 | * | 1/2009  | Pally ................. 715/738 |
| 2009/0025016 | A1 | * | 1/2009  | Crucs ................ 719/329 |
| 2010/0299591 | A1 | * | 11/2010 | Suehiro et al. ........ 715/239 |

OTHER PUBLICATIONS

Anonymous, "Drag and Drop Available Target Indicator"; Research Disclosure, Mason Publications, Hampshire, GB, vol. 341, No. 44m Sep. 1, 1992; XP007118121.

* cited by examiner

*Primary Examiner* — Steven Sax
(74) *Attorney, Agent, or Firm* — Jessica J. Costa

(57) ABSTRACT

A target-alignment-and-drop control for an electronic document editing tool which ensures that objects are inserted only in valid drop target areas and are aligned according to predetermined alignment rules.

12 Claims, 18 Drawing Sheets

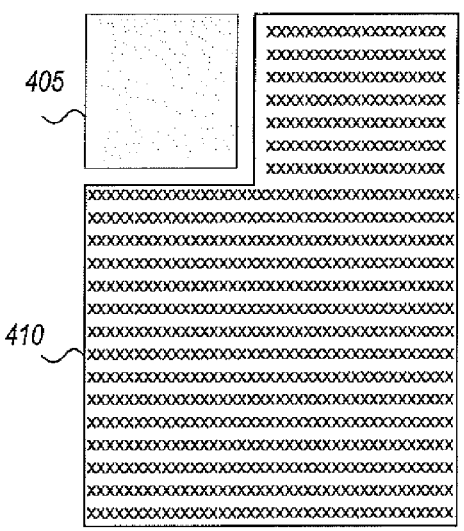
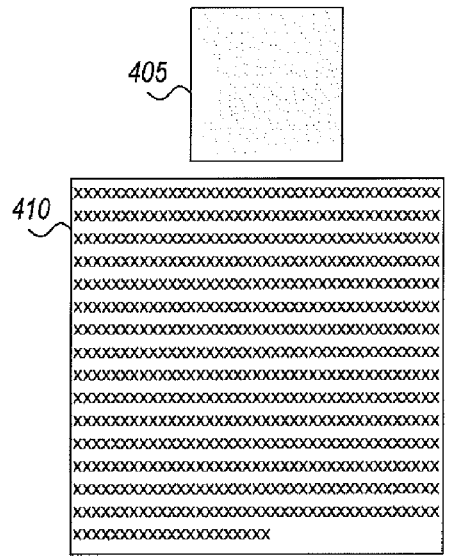
FIG. 4A   FIG. 4B
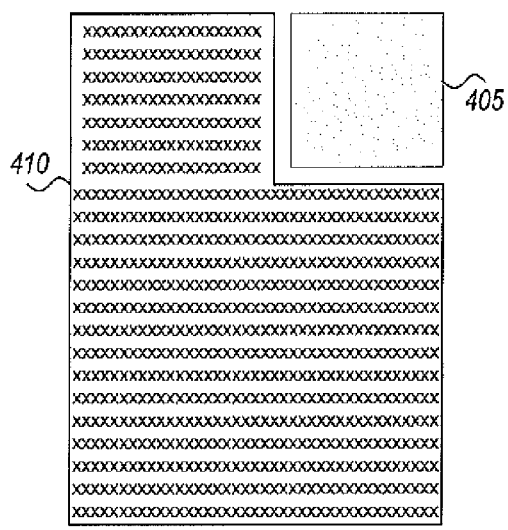
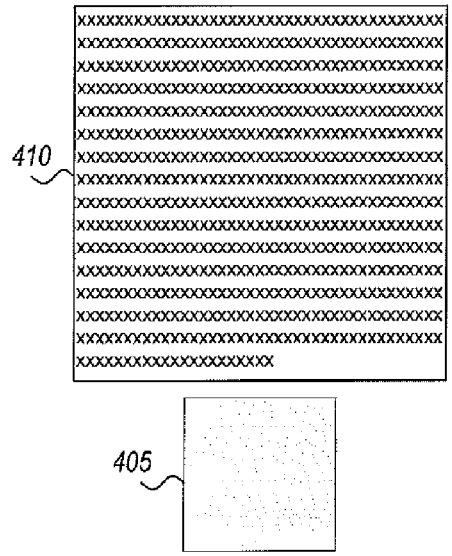
FIG. 4C   FIG. 4D

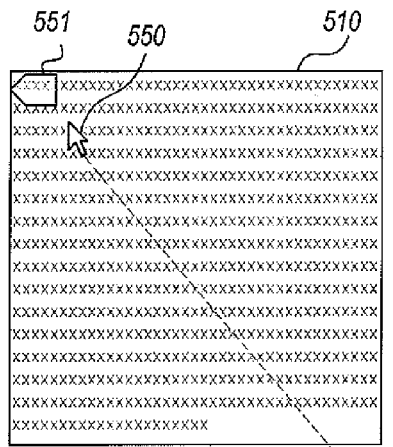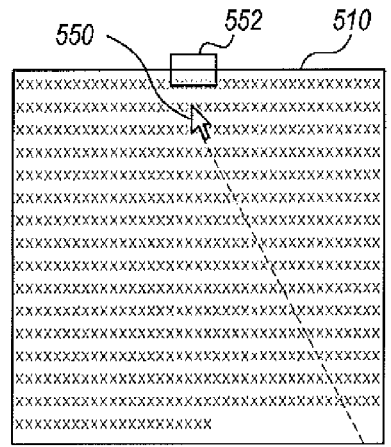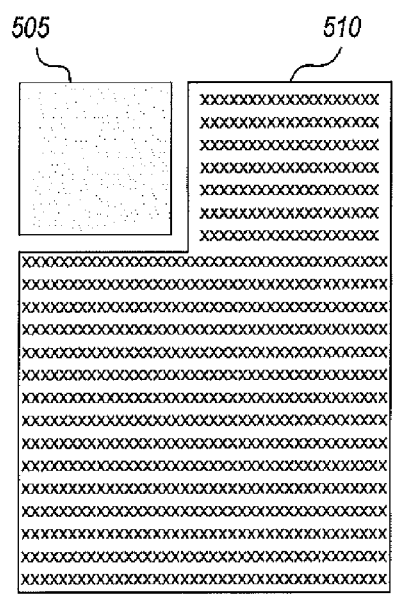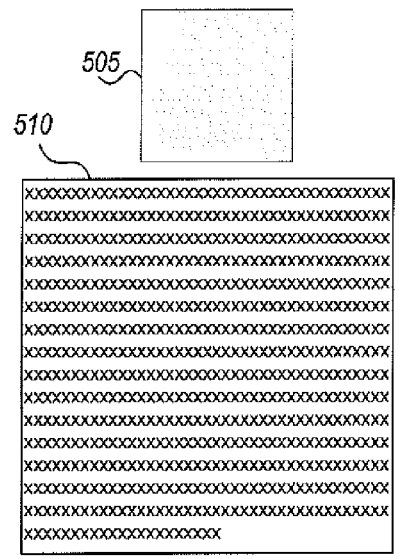
FIG. 5A　　　　　　　　　FIG. 5B

TARGET-ALIGNMENT-AND-DROP CONTROL FOR EDITING ELECTRONIC DOCUMENTS

FIELD OF THE INVENTION

This invention relates to creation and design of electronic documents and, more particularly, to a target-alignment-and-drop control for positioning objects in editable areas of an electronic document.

BACKGROUND OF THE INVENTION

Electronic documents are used in a variety of applications, including, for example and not limitation, web pages, electronic invitations and business cards that may be emailed or otherwise electronically transmitted to other parties, electronic publishing applications, and other software applications that allow user display and editing.

In many electronic document editing applications, the environment is a What-You-See-Is-What-You-Get (WYSISYG) environment in which what is displayed to the user in the editing environment is substantially what the final electronic document will look like. For example, in a website building application, a web page may be displayed to a user with controls that allow the user to edit portions of the page that will later be published (in non-editable form) to a website.

While it is desirable to allow experienced website builders to have nearly complete control over the format and editing of the web page, this type of control requires a more complicated user interface which in turn requires significant learning investment on the part of the user, and also does not prevent a less experienced user from violating what may be considered by the design industry as "good" design principles.

Accordingly, it would be desirable to provide an electronic document editing environment that has a simple user interface and allows some user control in positioning elements relative to one another yet enforces "good" design principles.

SUMMARY OF THE INVENTION

Embodiments of the invention are directed to a target-alignment-and-drop control for an electronic document editing tool which ensures that objects are inserted only in valid drop target areas and are aligned according to predetermined alignment rules.

In accordance with one embodiment of the invention, a computer-implemented method for positioning an object in a region of text in an electronic document, and computer readable medium for executing the method, includes steps and code for detecting activation of a target-alignment-and-drop control with respect to an object, monitoring a position of a cursor as it is dragged from a first position to a second position in the electronic document, determining whether the second position is within boundaries of a valid drop target area and selecting the valid drop target area if second position is within the boundaries of the valid drop target area, if the cursor is detected to be within the boundaries of a valid drop target area, determining alignment areas for the drop target area, the alignment areas having associated alignment rules which dictate placement of an object within the drop target area for each determined alignment area, selecting a current alignment area in which the second position is located, displaying an alignment indicator which indicates a general position of alignment where the object will be inserted if the target-alignment-and-drop control is released, detecting a release of the target-alignment-and-drop control, and inserting the object in the selected drop target area.

It is an advantage of the invention that target areas of an object drop do not change during activation of the control. It is a further advantage of the invention that good design principles are enforced while still allowing the user of the design tool some design control over the content and position of objects in the electronic document.

These and other objects, features and advantages of the invention will be better understood with reference to the accompanying drawings, description and claims.

BRIEF DESCRIPTION OF THE DRAWINGS

FIG. 4A is a diagram illustrating an object inserted within a text paragraph wherein the object is aligned to the top left corner of the paragraph.

FIG. 4B is a diagram illustrating an object inserted within a text paragraph wherein the object is above the paragraph and aligned to the horizontal center of the paragraph.

FIG. 4C is a diagram illustrating an object inserted within a text paragraph wherein the object is aligned to the top right corner of the paragraph.

FIG. 4D is a diagram illustrating an object inserted within a text paragraph wherein the object is below the paragraph and aligned to the horizontal center of the paragraph.

FIG. 5A is a view of an example web page illustrating a user experience with an embodiment of a target-alignment-and-drop control for aligning and dropping an object in the upper left corner of a text paragraph.

FIG. 5B is a view of an example web page illustrating a user experience with an embodiment of a target-alignment-and-drop control for aligning and dropping an object above, and horizontally centered to, a text paragraph.

DETAILED DESCRIPTION

Figure 1A:
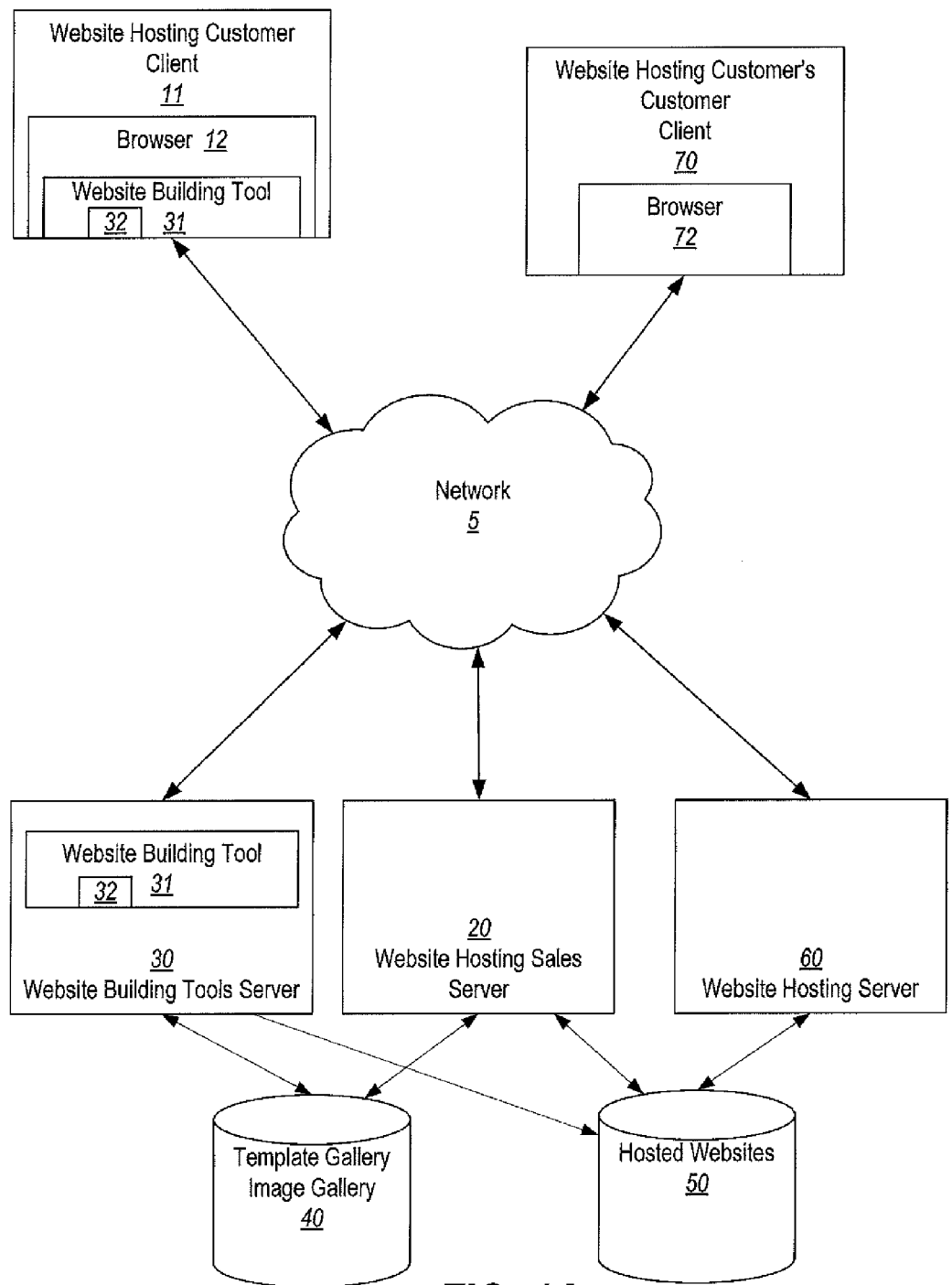
FIG. 1A is a block diagram illustrating a network environment in which an embodiment of the invention operates.

FIG. 1A depicts an exemplary networked system 1 in which embodiments of the invention are utilized. Client System 11 represents a user's computer system, for example, a customer of a website hosting service. Client system 11 is a typically equipped modern personal computer, discussed with reference to FIG. 1B, being configured to communicate over the Web and running a modern Web browser program 12. For purposes of discussion, the invention will be described in the context of a personal computer running the Microsoft Internet Explorer browser, but it will be appreciated that the invention can be applied to other browser programs that support DHTML, XHITML, HTML, XML, and other web functionality and to other intelligent devices, such as PDAs capable of running such a browser.

Client 11 communicates with a website hosting service server 20 to set up account information and order website hosting services via the client's browser 12. After setting up an account, the website hosting customer may then begin designing and editing their website. In an exemplary embodiment, the website hosting service provides website building tools via website building tools server 30. In an embodiment, the client 11 may download a website building tool 31 to execute in their local browser 12.

The website building tool 31 allows the website hosting services customer to download website templates (stored in a template and image gallery 40) from the website building tools server 30. Website templates are electronic web page designs that include editable areas to allow the customer to customize text, image, and design content. The website building tool 31 includes a target-alignment-and-drop control 32 that ensures that objects inserted in the editable area are inserted only in pre-determined valid drop target areas and in pre-determined valid alignment areas positioned according to associated alignment rules.

The website hosting services customer may edit and design a customized website which may be published to a hosted website database 50. When a web page is published to the hosted websites database 50, a website hosting server 60 will serve web pages of the hosted website to other networked clients on the network, such as client customer 70 of the website hosting services customer 11.

Website Building Tool 31 runs in a client's browser 12, and allows browser-based document creation and editing. One prior art system for performing browser-based document creation and editing is disclosed in U.S. Pat. No. 7,340,673 entitled "System and method for browser document editing", which is hereby incorporated by reference. U.S. Pat. No. 7,340,673 discloses a system wherein an HTML document editing tool is downloaded to the user's browser. Neither system expressly discusses a control for enforcing "good" design principles in relation to inserting images and other objects into editable text areas of a document.

Figure 1B:
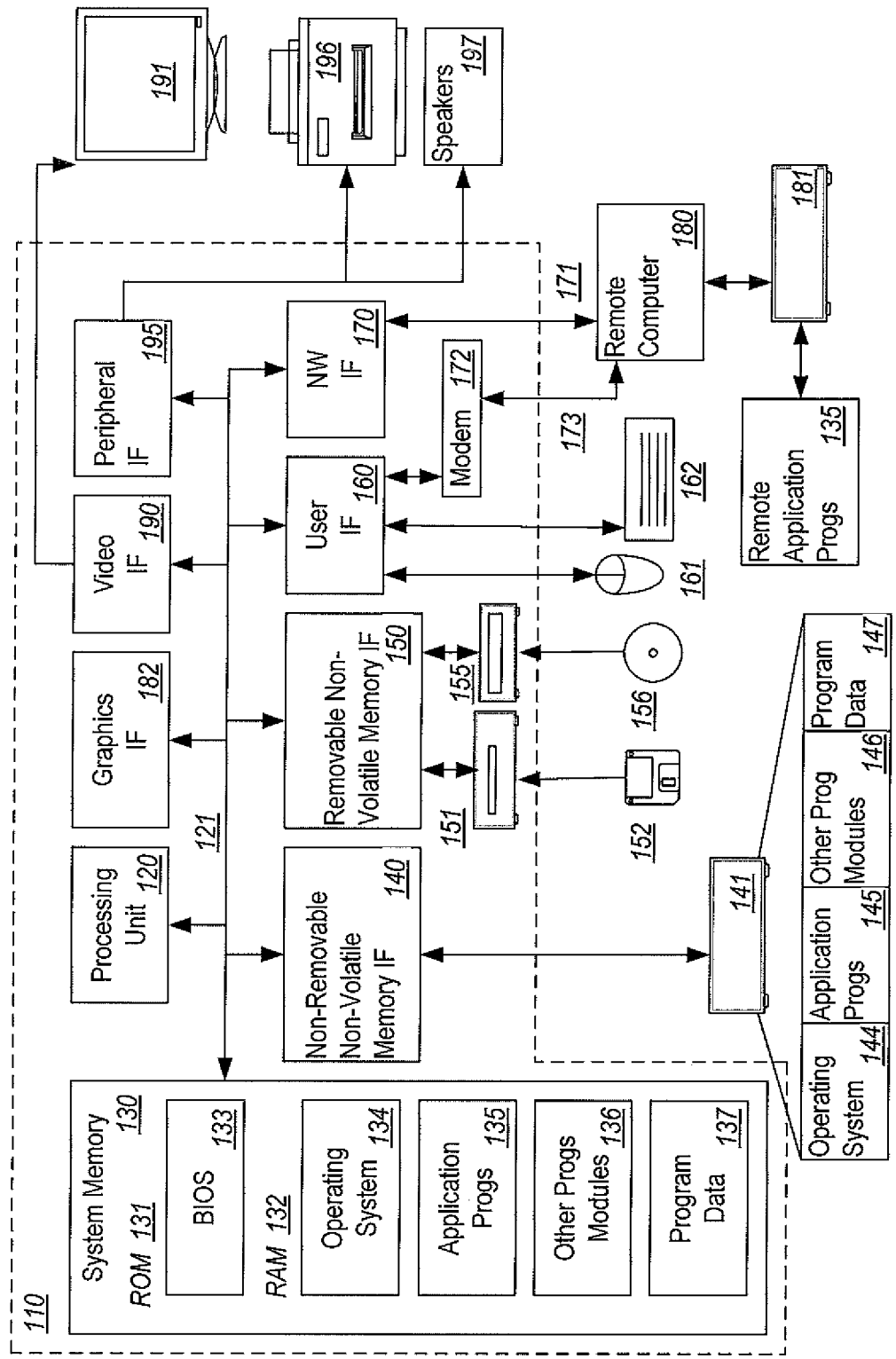
FIG. 1B is a block diagram illustrating a user computer environment in which an electronic publishing tool may operate.

FIG. 1B illustrates an example of a suitable computing system environment 100 implementing the website hosting services customer client 11 in FIG. 1A. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention, and in particular, the website building tool 31 and its target-alignment-and-drop control 32 integrated therein, may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1A, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data, Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 4 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
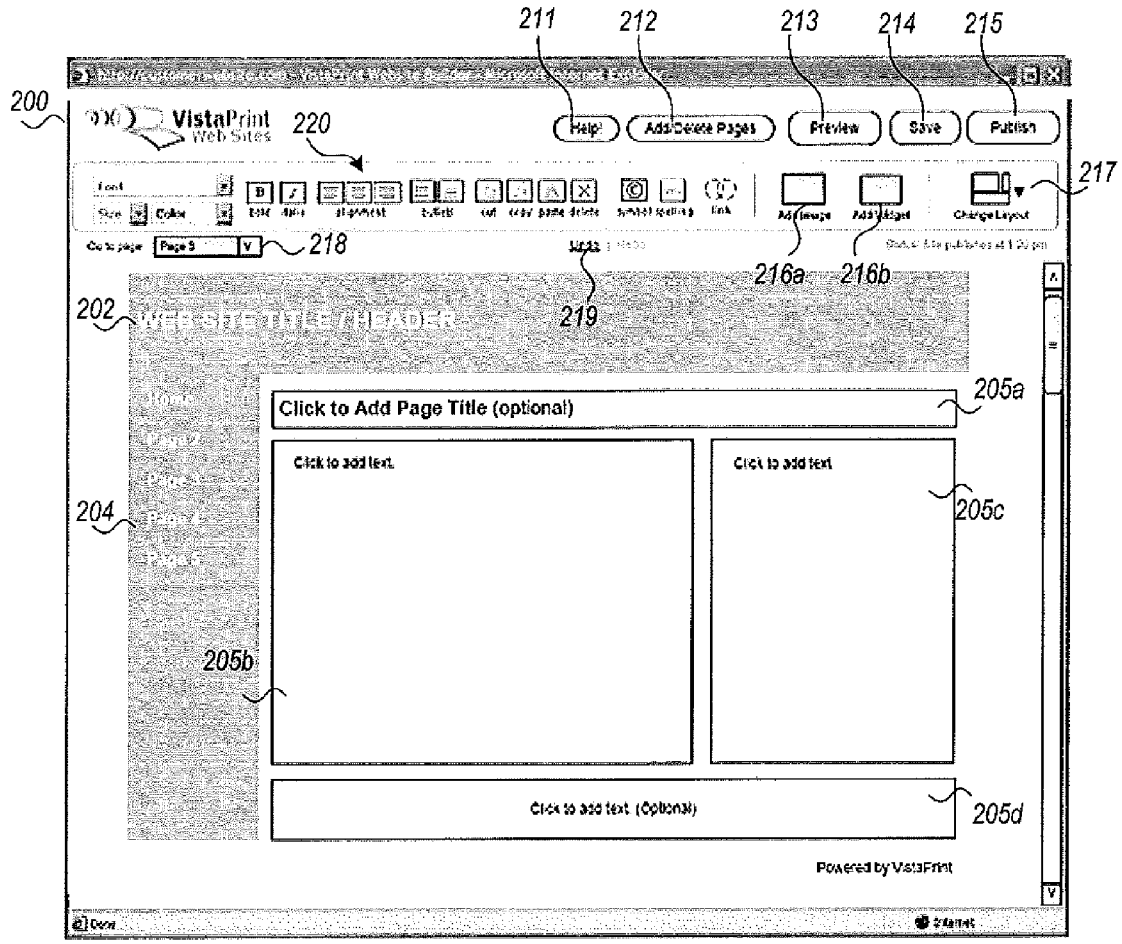
FIG. 2 is a view of a browser window illustrating an exemplary embodiment of a web page template.

FIG. 2 is an exemplary embodiment of an example web page template 200 which may be edited using the website builder tool 31 of FIG. 1A. As illustrated in FIG. 2, the web page template 200 includes a header area 202, a navigational area 204, a number of editable content areas 205a, 205b, 205c, and a number of controls 211-220.

A Help Button control 211 triggers a separate browser window when selected (e.g., by clicking on the button with a mouse cursor) and assists the user in obtaining answers to questions related to the operation and use of the website builder tool 31. An Add/Delete Pages Button control 212 triggers a DHTML overlay or popup window that allows users to make site-level changes, including add and delete pages, rename pages, etc. A Preview Button control 213 allows the user to view their website as if they were browsing it normally without any of the website builder tool 31 functionality shown. The Save Button control 214 saves the website design. The Publish Button control 215 saves any changes in the website to a published database 50 so that people browsing their site will see the changes.

The Add Image control 216a, and Add Widget control 216b will trigger DIHTML overlay/popups that allow users to add images or widgets such as maps or forms to the page content. The Change Layout control 217 triggers a DHTML drop-down menu which allows users to select a different page layout. The Page Navigation control 218 allows a user to switch between pages of thaier website for editing. The Undo|Redo control 219 allows a user to undo or redo any action from text editing to layout changes. The Edit controls 220 include Rich Text Editing controls.

Figure 3:
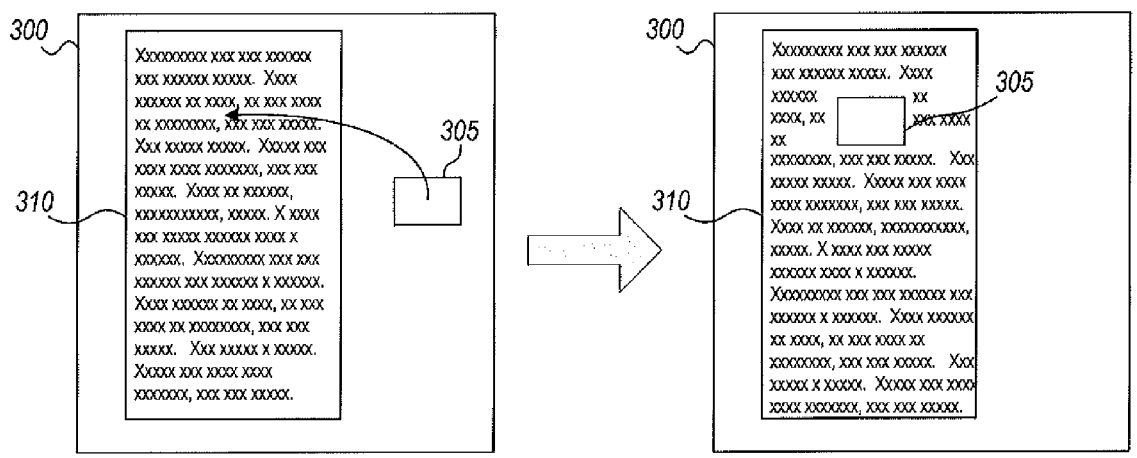
FIG. 3 is a view of a browser window illustrating an example web page for editing by a user.

FIG. 3 is an example of a web page 300 comprising a text container 310 having multiple paragraphs of text and an image 305. In a conventional drag-and-drop functionality, when a user selects the image 305 and drags it to an absolute position within the text container, the image 305 is dropped (inserted) at the absolute position in the text container, and the text is adjusted to flow around it. While this functionality gives the user a lot of control over where to place images and other objects on a web page, in a tool designed for usability by novice or amateur designers, this type of user control in object placement may result in less than optimal designs. For example, usability studies may reveal that inserting an image in the middle of a paragraph makes it difficult to follow the flow of the text.

In accordance with embodiments of the present invention, a website builder tool 31 includes enforced design rules which limit the placement of various objects within text containers to predetermined target areas that according to conventionally accepted design principles are known to be more ascetically pleasing than just any position in a to given paragraph of text. For example, in an embodiment image and widget objects 405 may be limited to placement in target areas including alignment to the top left of the paragraph 410

(as illustrated in FIG. 4A), centered above a paragraph (as illustrated in FIG. 4B), alignment to the top right of the paragraph (as illustrated in FIG. 4C), or centered below a paragraph (as illustrated in FIG. 4D).

Figures 5C, 5D:
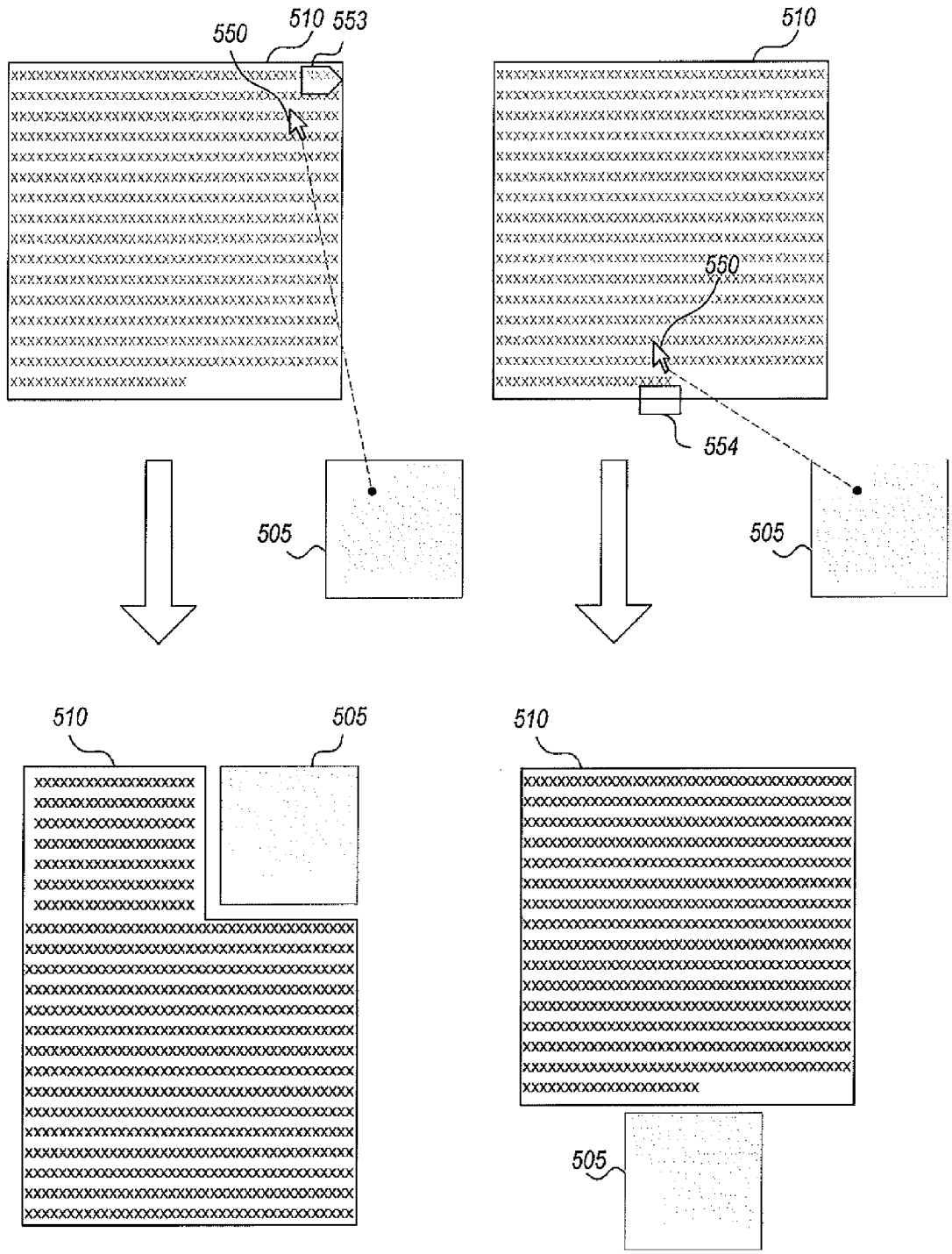
FIG. 5C is a view of an example web page illustrating a user experience with an embodiment of a target-alignment-and-drop control for aligning and dropping an object in the upper right corner of a text paragraph.
FIG. 5D is a view of an example web page illustrating a user experience with an embodiment of a target-alignment-and-drop control for aligning and dropping an object below, and horizontally centered to, a text paragraph.

FIGS. 5A-5D illustrate example web pages for various user experiences with an target-alignment-and-drop control 32 implemented in accordance with an exemplary embodiment of the invention. In FIG. 5A, a user clicks on an image object 505, which activates the target-alignment-and-drop control 505, and then drags the cursor 550 over the upper left portion of a text paragraph 510. An alignment marker 551 appears over the text, and within the upper left hand corner area of the text paragraph 510 to visually indicate to the user that the upper left hand corner of the text paragraph 510 is the current target region for inserting the object. If the user releases the control 32 (in the standard click-to-select-and-drag and then click-to-drop-and-release mouse usability) to drop the image object 505, the target-alignment-and-drop control 32 inserts the object 505 at the upper left hand corner of the text paragraph 510 and reformats the text to flow around (to the right and below) the inserted object 505.

In FIG. 5B, a user clicks and drags image object 505 over the upper center portion of text paragraph 510. An alignment marker 552 appears above the text paragraph 510 to visually indicate to the user that the current target region for inserting the object 505 is above the paragraph (and centered). If the user releases the click to drop the image object 505 while the current target region is above-centered, the target-alignment-and-drop control 32 inserts the object 505 above, and centered to the width dimension of, the text paragraph 510.

In FIG. 5C, a user clicks and drags image object 505 over the upper right portion of a text paragraph 510. An alignment marker 553 appears over the text, and within the upper right hand corner area of the text paragraph 510 to visually indicate to the user that the current region for inserting the object 505 is the upper left right corner of the text paragraph 510. If the user releases the click to drop the image object 505 while the current target region is the upper right hand corner of the text paragraph 510, the target-alignment-and-drop control 32 inserts the object at the upper right hand corner of the text paragraph 510 and reformats the text to flow around (to the left and below) the inserted object 505.

In FIG. 5D, a user clicks and drags image object 505 over the lower portion of text paragraph 510. An alignment marker 554 appears below the text paragraph 510 to visually indicate to the user that the current target region for inserting the object 505 is below the text paragraph (and centered). If the user releases the click to drop the image object 505 while the current target region is below-centered, the target-alignment-and-drop control 32 inserts the object 505 below, and centered to the width dimension of, the text paragraph 510.

The usability scenarios illustrated in FIGS. 5A through 5D thereby allow the user to exert substantial control 32 on the positioning of objects within the text, while at the same time enforcing certain design rules (such as requiring that images may be inserted only in ascetically pleasing places within text) that tend to follow widely accepted design principles.

The alignment markers 551, 552, 553, 554 may be implemented with a graphical icon, such as an arrow, or some other visual indicator such as highlighting or shading the target area of the text paragraph 510 over which the object 505 is currently being dragged. If the alignment marker is an icon, it need not actually be located over the current target region itself, but must somehow visually indicate to the user that the current target region is actually the current target region. For example, if the alignment marker is a graphical arrow, the arrow itself may be positioned next to (i.e., not over) the text paragraph 510 with the arrowhead pointing to the current target region. In the illustrated embodiment of FIGS. 5A-5D, an alignment marker is only displayed to the user when the target-alignment-and-drop control 32 is activated and the object being dragged is currently within the target region corresponding to the alignment marker. In other embodiments, all alignment markers may be simultaneously displayed upon activation of the target-alignment-and-drop control 32 to assist the user in determining what target areas are available and in deciding which of the available target areas to choose.

Figure 6:
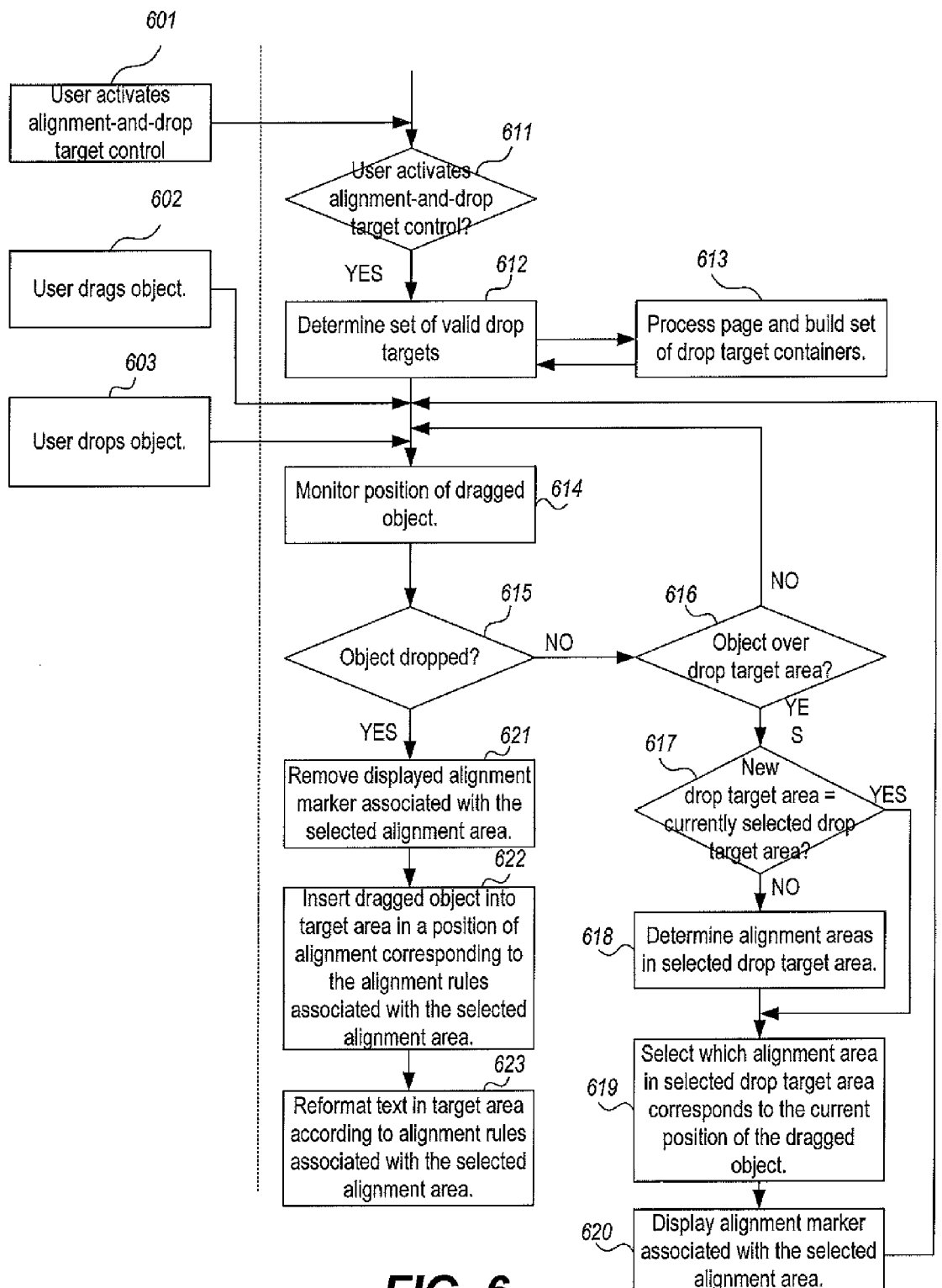
FIG. 6 is a flowchart of an exemplary embodiment of an target-alignment-and-drop control method.

FIG. 6 is a flowchart of an exemplary embodiment of an target-alignment-and-drop control method 600. In the illustrated method 600, user actions are shown to the left of the dotted line and computer-implemented actions, for example implemented in JavaScript, are shown to the right of the dotted line. In the exemplary embodiment, the user activates the target-alignment-and-drop control 32 (step 601), for example by clicking on an image object in the web page. The target-alignment-and-drop control 32 monitors for activation of the control (step 611).

Figure 7:
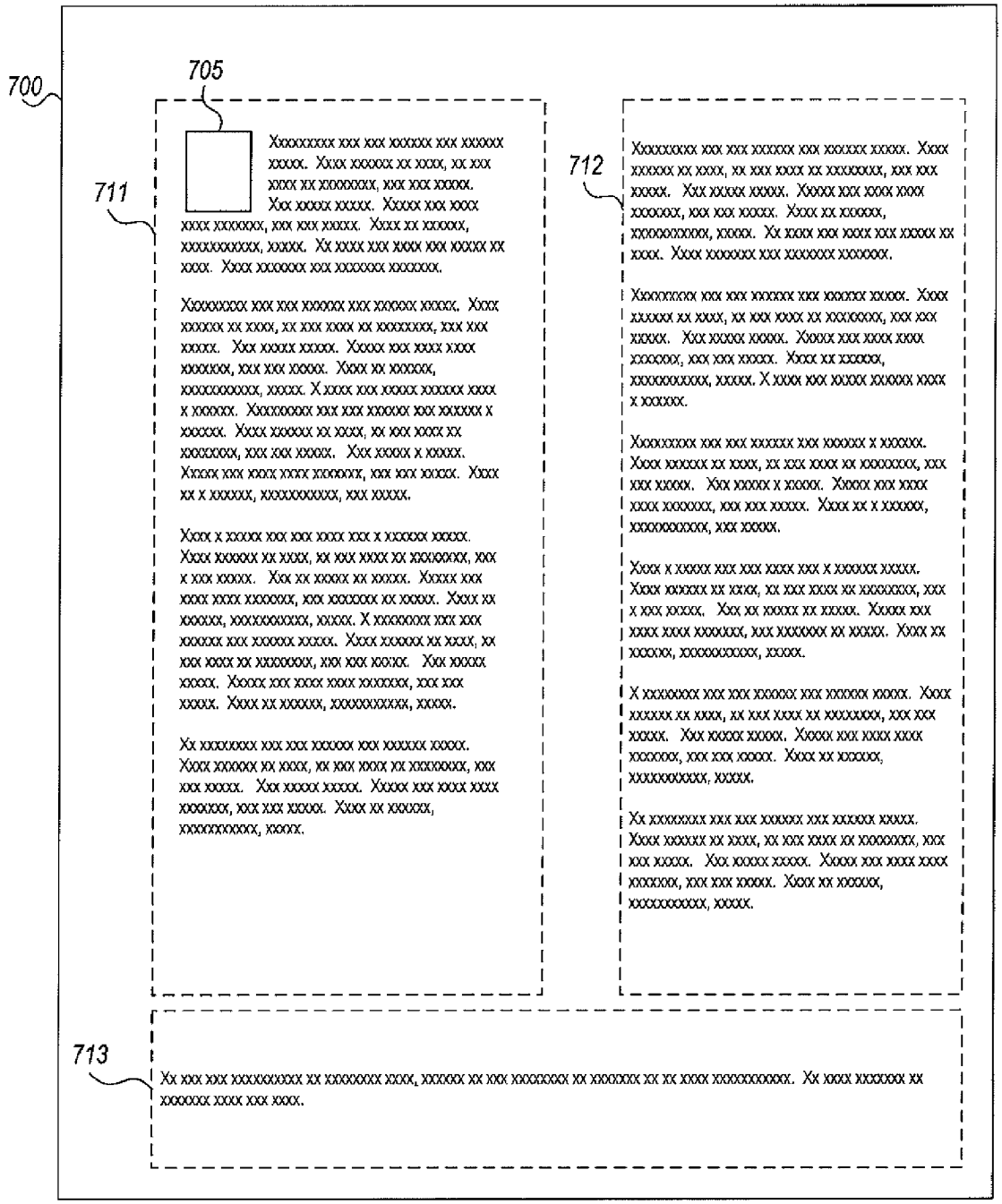
FIG. 7 is a view of an example web page in which a target-alignment-and-drop control is implemented.

For example, FIG. 7 illustrates an example web page 700 having editable text areas 711, 712, and 713, and an image 705 positioned within one of the editable text areas 711. Activation of the target-alignment-and-drop control 32 may be by mere selection an image object 705 by the user clicking on the object 705 with a mouse, or may be via other graphical user interface control activation means such as selection of a control icon on a drop-down menu or toolbar, right-clicking on the object 705 and selecting a menu item corresponding to the control, etc.).

User activation of the target-alignment-and-drop control 32 triggers the target-alignment-and-drop control 32 to determine a set of valid drop targets on the page (step 612). In an exemplary embodiment, and with reference to FIGS. 7 and 8, the target-alignment-and-drop control 32 processes a currently displayed web page, such as 700 in FIG. 7, and builds a set of drop target containers or areas 821, 822, 823, 824, illustrated in a layout page 800, shown in FIG. 8 (step 613). Each drop target area 821, 822, 823, 824 encapsulates a single text paragraph in the text container 711 containing the selected image object 705. In an embodiment, a JavaScript class processes the currently displayed DHTML page and determines the locations and corresponding sizes of the text paragraphs in the selected text container 711 on the page 700 based on the root paragraph HTML tags. Thus, lists and other embedded paragraphs would be considered part of the root paragraph In an embodiment, the set of drop target areas 821, 822, 823, 824 may be normalized such that no drop target area overlaps any other, the entire area of the text container 711 is covered by at least one drop target area 821, 822, 823, 824, no drop target area 821, 822, 823, 824 takes up less than a predetermined minimum size (i.e., no zero line containers), and all drop target areas 821, 822, 823, 824 are the width of the entire selected text container 711.

After activating the control 32 with respect to the object 705, the user drags the cursor over editable text areas 711, 712, 713 on the web page 700, and the target-alignment-and-drop control 32 monitors the position of the dragged cursor on the web page (step 603). The target-alignment-and-drop control 32 monitors the position of the dragged cursor (step 614) and detects conditions including whether the object 705 has been dropped (step 615) (by the user releasing the mouse click) and whether the object 705 is currently over a drop target area 821, 822, 823, 824 (step 615).

Upon detection that the dragged cursor is within a drop target area 821, 822, 823, 824 (from step 616), the targetalignment-and-drop control 32 determines whether the detected drop target area is already currently selected (step 617), and if so, moves directly to the alignment area selection step (step 619), discussed momentarily. If the detected drop target area is not the currently selected drop target area, the currently selected drop target area is set to the newly detected drop target area, and the target-alignment-and-drop control 32 then determines at least two alignment areas within the drop target area (step 618). For example, in an exemplary embodiment illustrated in FIG. 7, since the object 705 is already positioned in the boundaries of drop target area 821, upon activation of the target-alignment-and-drop control 32, the currently selected drop target area is the drop target area 821 in which it resides. As the cursor is dragged out of the current drop target area 821 and crosses the boundaries of another drop target area, the currently selected drop target area is updated to reference the drop target area that the cursor is actually over. For example, with reference to FIG. 8, if the cursor is dragged down the page such that the cursor crosses into the boundaries of the drop target area 822, the currently selected drop target area is updated to drop target area 822.

Figure 8:
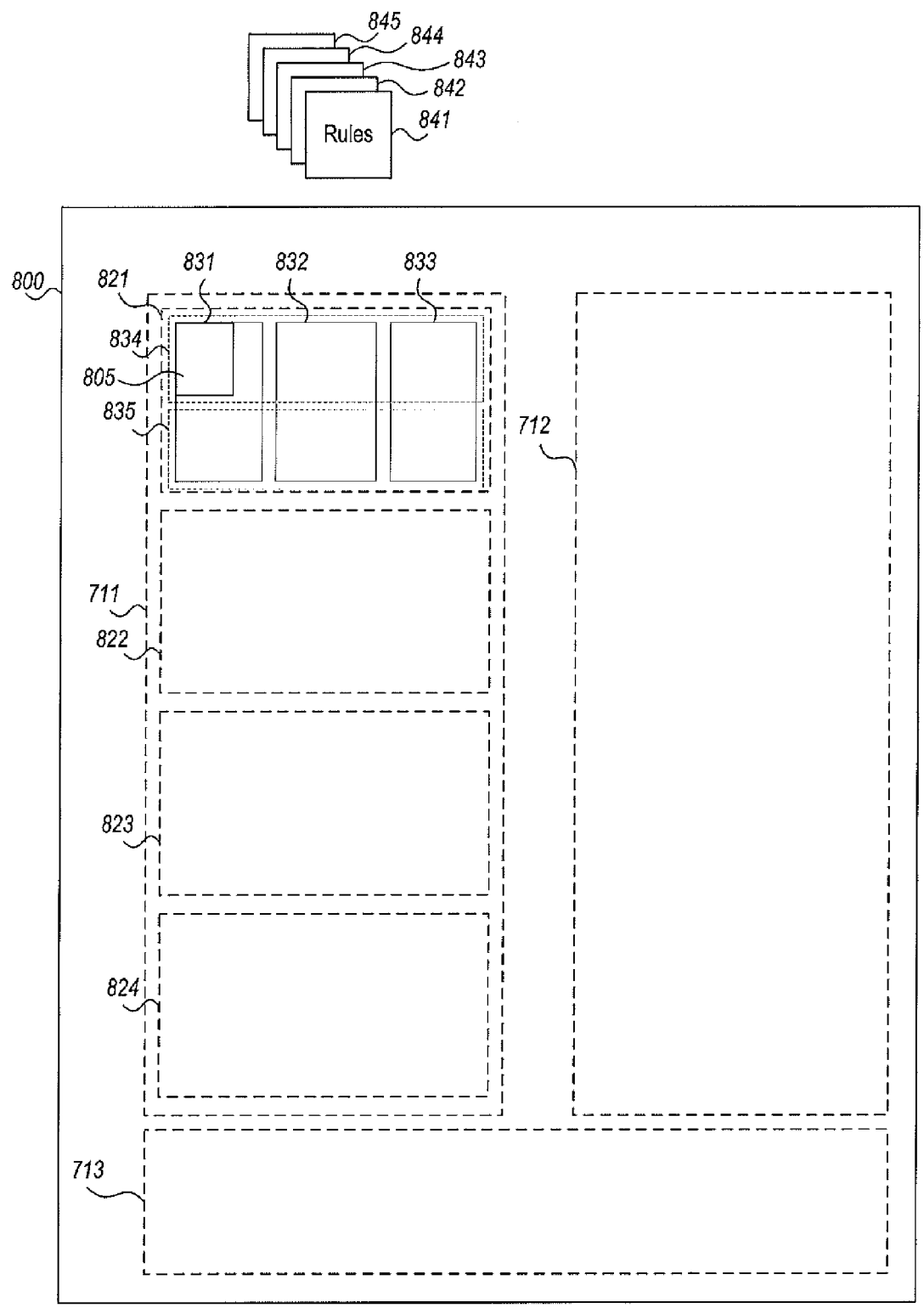
FIG. 8 is a layout view of the example web page of FIG. 7 as kept track of by the target-alignment-and-drop control, after activation of the target-alignment-and-drop control.

Upon selection of the current drop target area, the target-alignment-and-drop control 32 calculates at least two alignment areas within the selected drop target area (step 618). With reference to FIG. 8, in an exemplary embodiment, the target-alignment-and-drop calculates three alignment areas 831, 832, 833, having boundaries in the shape of rectangles or columns. The three alignment areas 831, 832, 833 may include a left alignment area 831, a center alignment area 832, and a right alignment area 833. The alignment areas may be in the shape of columns, for example, each of which may correspond to exact thirds of the available width of the text container 711, or may be calculated to allocate more column width to the outer columns or to the center column. The left column corresponds to a left alignment area 831, the center column corresponds to a center alignment area 832, and the right column corresponds to a right alignment area 833.

Each alignment area 831, 832, 833 has associated with it a set of alignment rules 841, 842, 843. For example, the left alignment area 831 may have alignment rules 841 which dictate that any object dropped within the boundaries of the alignment area 831 are aligned to the upper left corner of the current drop target area 821 and any text currently within the boundaries of the selected drop target area 821 is then reformatted to fill first any existing area to the right of the dropped object and then below the dropped object (for example as illustrated in FIG. 5A). Continuing with this example, the right alignment area 833 may have alignment rules 843 which dictate that any object dropped within the boundaries of the right alignment area 833 are aligned to the upper right corner of the current drop target area 821 and any text currently within the boundaries of the selected drop target area 821 is then reformatted to fill first any existing area to the left of the dropped object and then below the dropped object (for example as illustrated in FIG. 5C). The center alignment rules 842 may dictate that any object dropped within the boundaries of the center alignment area 832 are placed above the selected drop target area 821 and aligned horizontally to the center of the selected drop target area 821 (for example as illustrated in FIG. 5B).

The target-alignment-and-drop control 32 may also calculate an upper alignment area 834 and a lower alignment area 835, which may be associated with different alignment rules 844 and 845. For example, if an object is dragged over an upper alignment area 834, the upper alignment area rules 844 may dictate application of the rules 841, 842, 843 associated with the left, center, and right alignment areas, whereas if the object 705 is dragged over any portion of the lower alignment area 835, the lower alignment area rules 845 may dictate that the object 705 is inserted below, and horizontally centered to, the current drop target area 821 (for example as illustrated in FIG. 5D).

Other alignment rules may exist. For example, in one exemplary embodiment, the design rules may dictate that image objects can only be placed below a drop target area if the selected drop target area is the bottom-most drop target area in the associated is text container. Likewise, the design rules may dictate that image objects can only be placed above a drop target area if the selected drop target area is the top-most drop target area in the associated text container. Other variations of the rules may be implemented while still remaining within the scope of the present invention.

Once the alignment areas are calculated (in step 618), the target-alignment-and-drop control 32 selects an alignment area (step 619) corresponding to an alignment area over which the cursor dragging the object is currently positioned. In an embodiment, the alignment areas 831-835 each cover an area of the selected drop target area 821 so that all areas of the selected drop target area 821 are covered by an alignment area.

Figure 9:
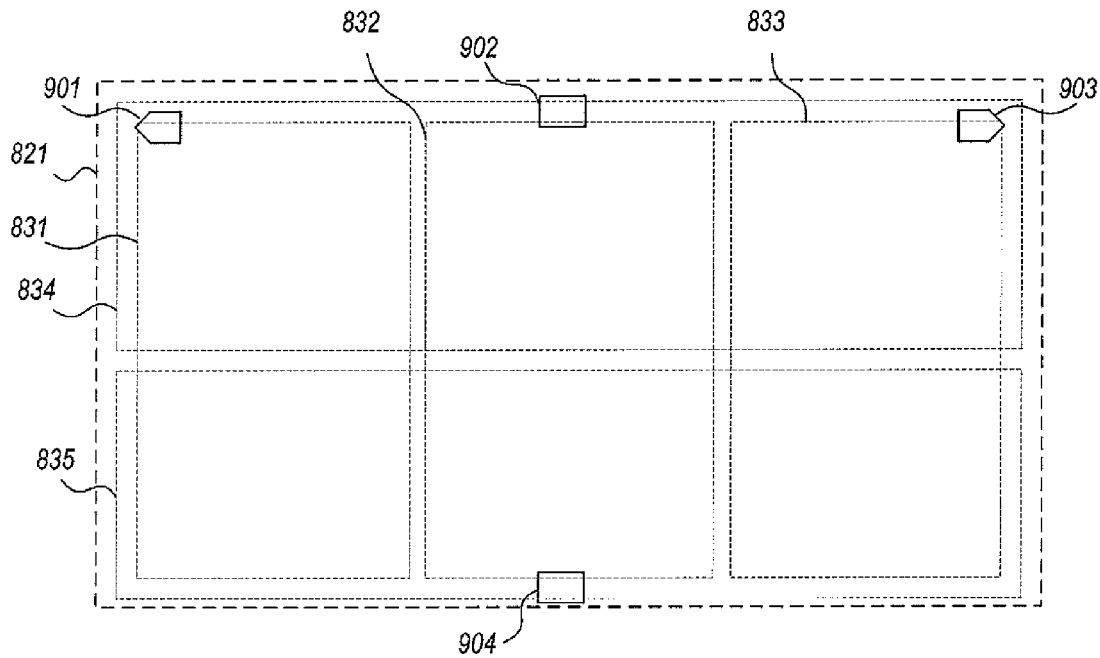
FIG. 9 is a layout view of a drop target area illustrating locations of alignment markers which may be displayed to the user upon activation of the target-alignment-and-drop control and dragging the cursor over one of the corresponding alignment areas.

Upon determining the selected alignment area in the selected drop target area, an alignment marker associated with the selected alignment area is displayed in connection with the selected drop target area (step 620). For example, FIG. 9 illustrates the positions of the alignment markers 901, 902, 903, 904 that will be displayed over the drop target area 821 if the cursor is dragged over the corresponding alignment areas 831, 832, 833, and 835, and prior to release of the object 705 (i.e., exiting or deactivating an activated target-alignment-and-drop control 32). When displayed on the web page of FIG. 7 as the object 705 is dragged over a valid drop target area and prior to release of the object 705, a marker 901, 902, 903, 904 that is displayed to the user indicates to the user that if the object is released while a marker is displayed, the object 705 will be positioned in the alignment area corresponding to the displayed marker in accordance with alignment rules associated with the selected alignment area.

Returning to FIG. 6, the user may choose to drop the object (step 603) in the selected alignment area or may drag it to another area within the selected drop target area or another drop target area. If the user drags the object over a different alignment area, the current alignment marker may optionally be removed from the user's display, or may alternatively remain on the display to indicate a possible drop target area for the duration of the active target-alignment-and-drop control 32, while highlighting or otherwise visually indicating to the user which alignment marker is currently active. The position of the dragged object is continually monitored (step 614) and the drag operation portion of the method (steps 616-620) may be performed repeatedly until the user drops the object (step 603).

Upon detection of a dropped object (step 615), the target-alignment-and-drop control 32 removes any currently displayed alignment markers from the display (step 621), inserts the object into a position of alignment corresponding to the alignment rules associated with the currently selected alignment area of the currently selected drop target area (step 622), and reformats any text in the selected drop target area according to the alignment rules associated with the selected alignment area (step 623).

Figure 10:
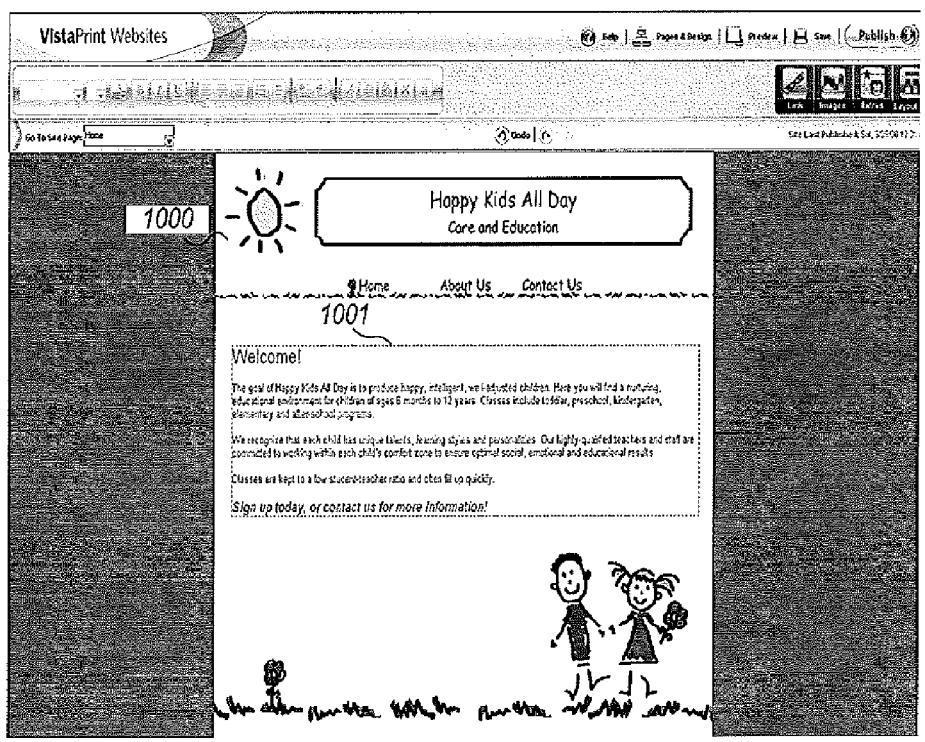
FIGS. 10-26 are screen shot views of an example web page illustrating an example operation of a target-alignment-and-drop control.
Figure 11:
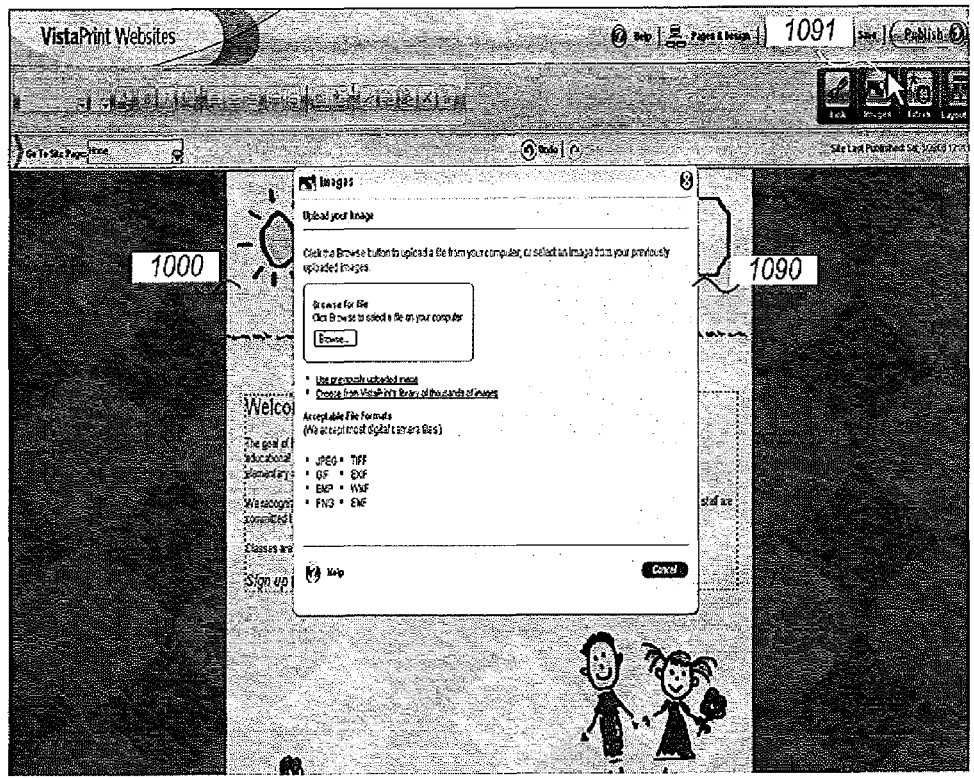
Figure 12:
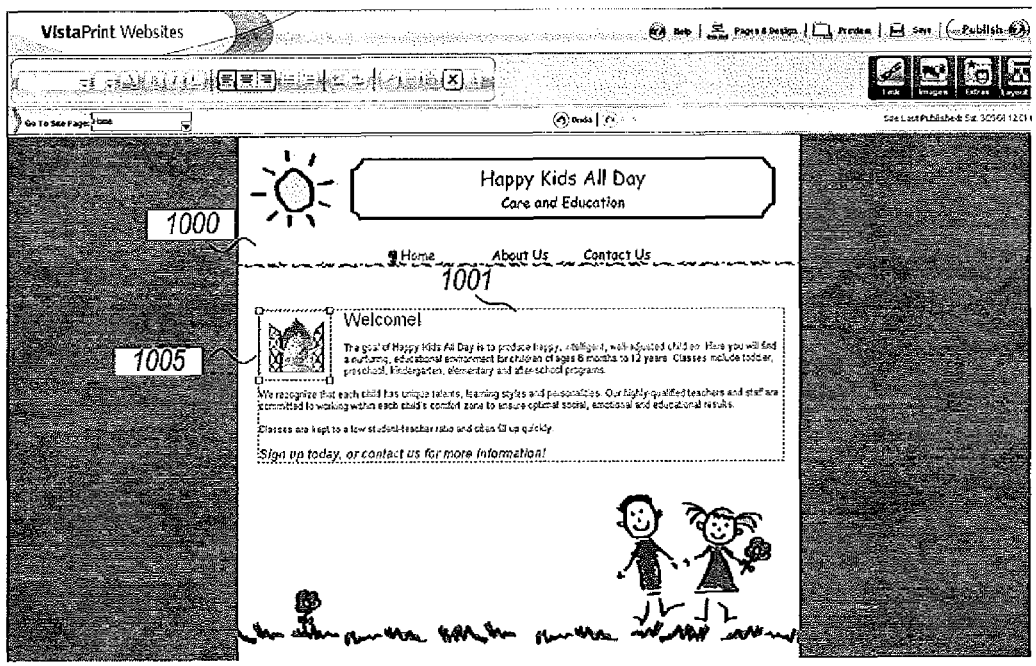

FIGS. 10-26 are screen shots of an example web page 1000 illustrating an example operation of a target-alignment-and-drop control 32. FIG. 10 illustrates the example web page 1000 being edited by a user. The web page 1000 includes an editable area 1001 having text paragraphs. FIG. 11 illustrates an image insertion control pop-up window 1090 which is displayed to the user upon activation of the image button control 1091. The image insertion control allows the user to upload an image into the editable text area. FIG. 12 illustrates the web page 1000 after the user has selected and uploaded an image 1005. The image is by default inserted in the text area 1001 in the upper left hand corner of the editable area 1001.

Figure 13:
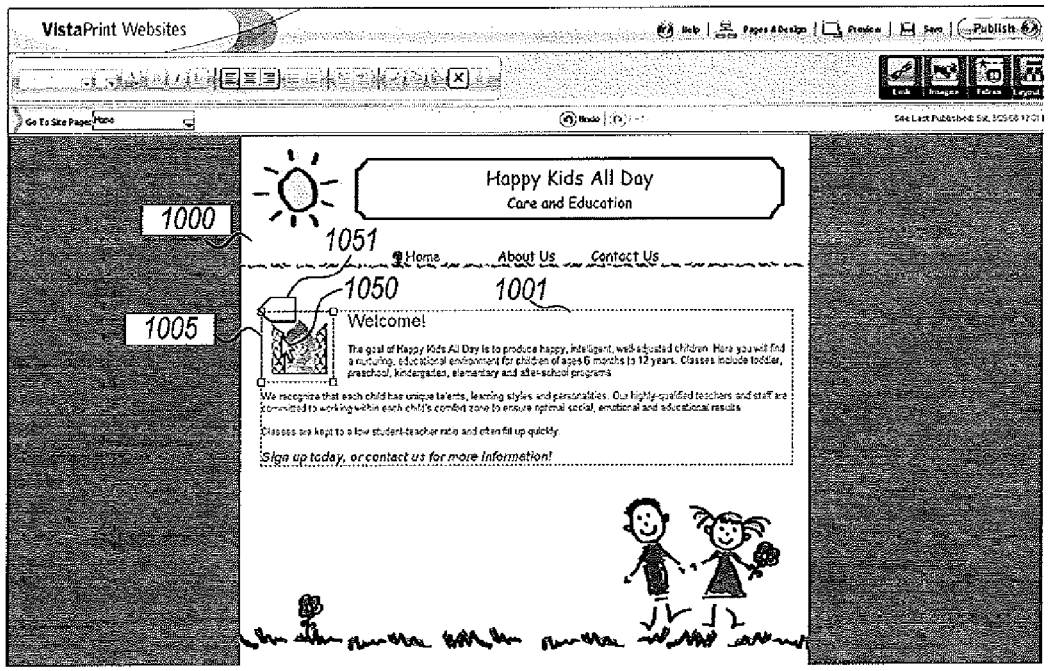

FIG. 13 illustrates the display of an alignment marker 1051 upon user activation of the target-alignment-and-drop control 32, for example by clicking on the image object 1005 with the mouse when the cursor 1050 is over the image object 1005. As illustrated, the alignment marker 1051 is displayed in the upper left corner of the editable area 1001 because the cursor is over the upper left alignment area (not shown, but corresponding to alignment area 831 in FIG. 8).

Figure 14:
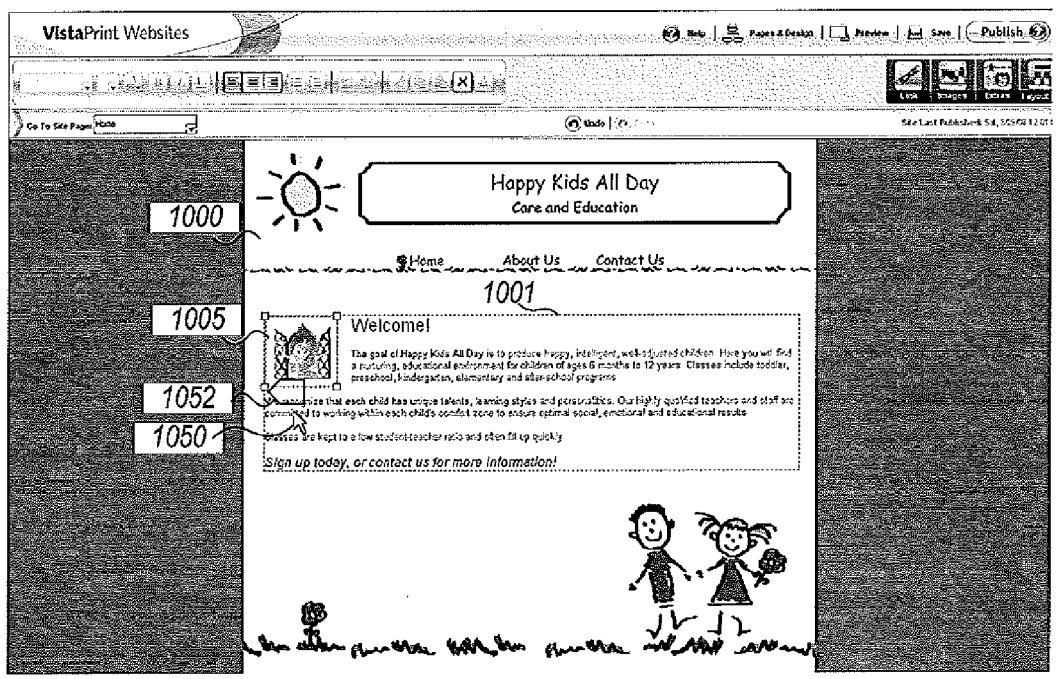
Figure 15:
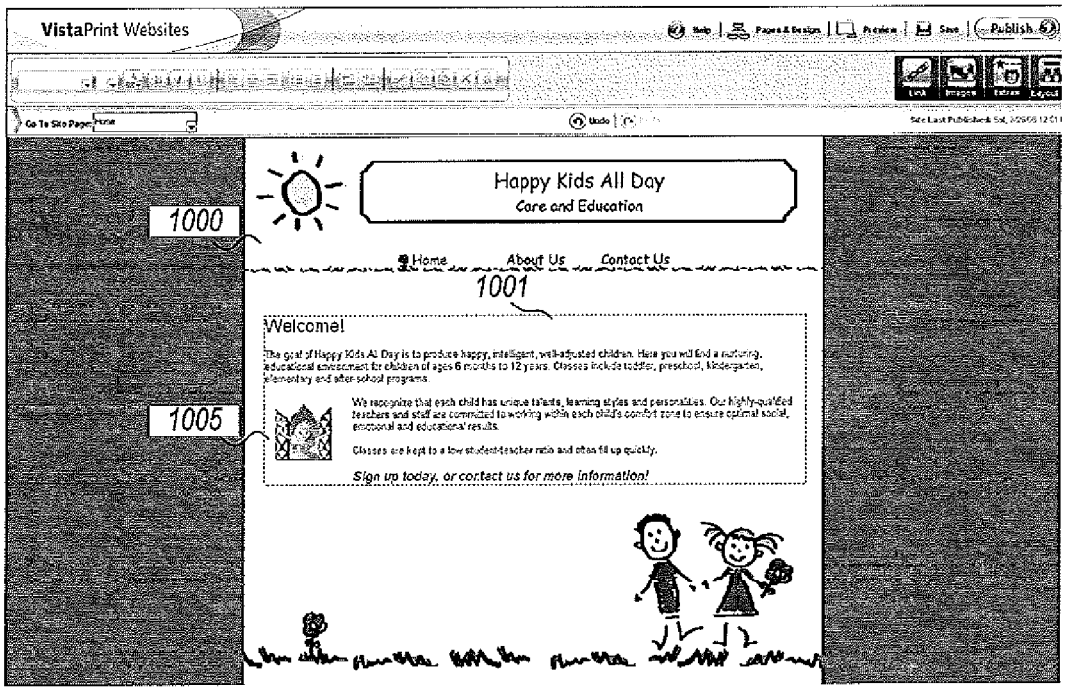

FIG. 14 illustrates the display of a new alignment marker 1052 as the cursor 1050 is dragged into the left hand side of the second text paragraph. As illustrated, the alignment marker 1052 indicates that if the target-alignment-and-drop control 32 is released (by clicking a second time with the mouse), while the cursor is in a position that results in the display of alignment marker 1052, the image object 1005 will be dropped (i.e., inserted) in the upper left hand corner of the second text paragraph. FIG. 15 illustrates the display of the web page 1000 after the user releases the target-alignment-and-drop control 32 to drop the image object 1005 into the position indicated by the alignment marker 1052. In this case, the image object 1005 is larger, vertically, than the second text paragraph, so the alignment rules associated with the alignment area corresponding to the alignment marker 1052 dictate that the text in the second paragraph and any following paragraphs are reformatted to flow around the right side of the image object.

Figure 16:
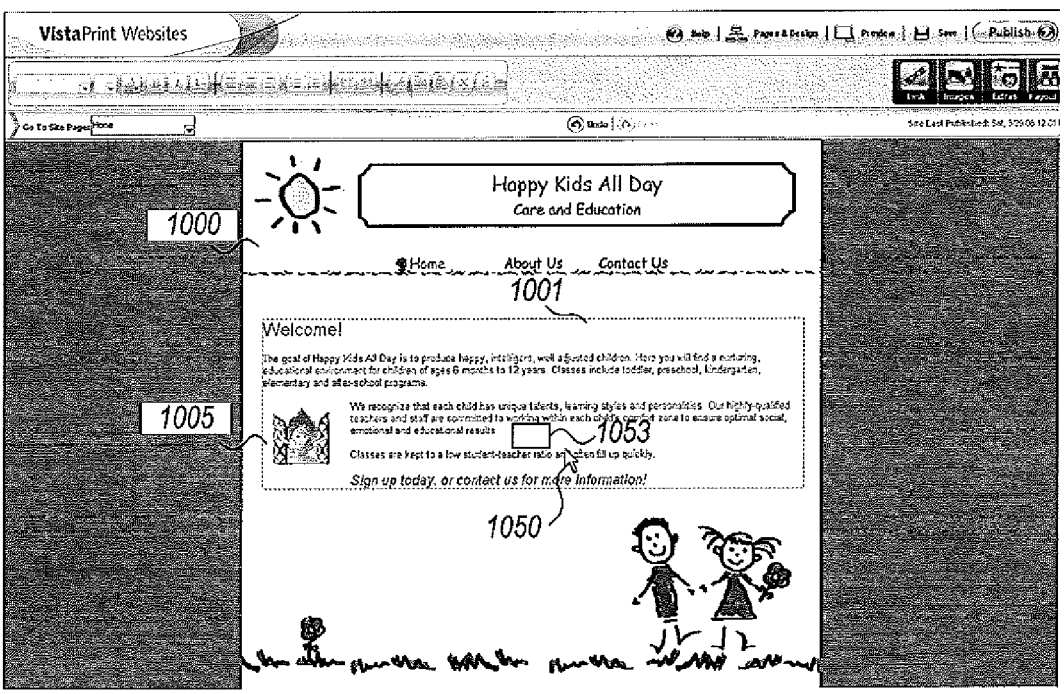
Figure 17:
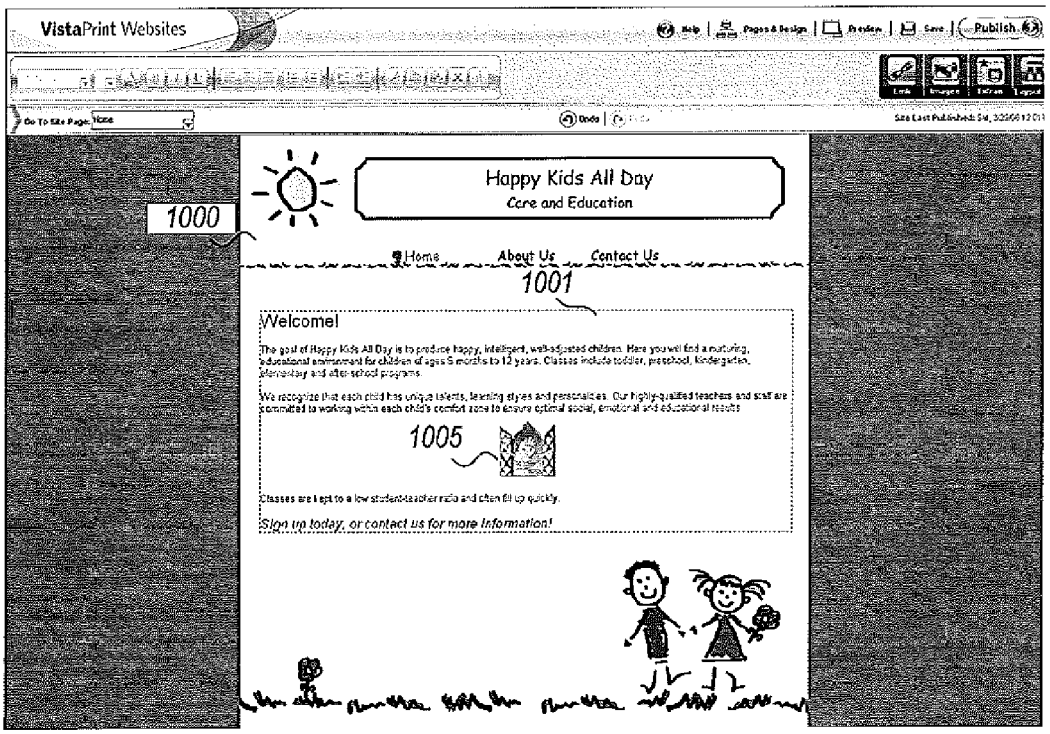

FIG. 16 illustrates the display of a new alignment marker 1053, after activation of the target-alignment-and-drop control 32, as the cursor 1050 is dragged towards the center of the second text paragraph. As illustrated, the alignment marker 1053 indicates that if the target-alignment-and-drop control 32 is released (by clicking a second time with the mouse), while the cursor is in a position that results in the display of alignment marker 1053, the image object 1005 will be dropped (i.e., inserted) in the center below the second text paragraph. FIG. 17 illustrates the display of the web page 1000 after the user releases the target-alignment-and-drop control 32 to drop the image object 1005 into the position indicated by the alignment marker 1053.

Figure 18:
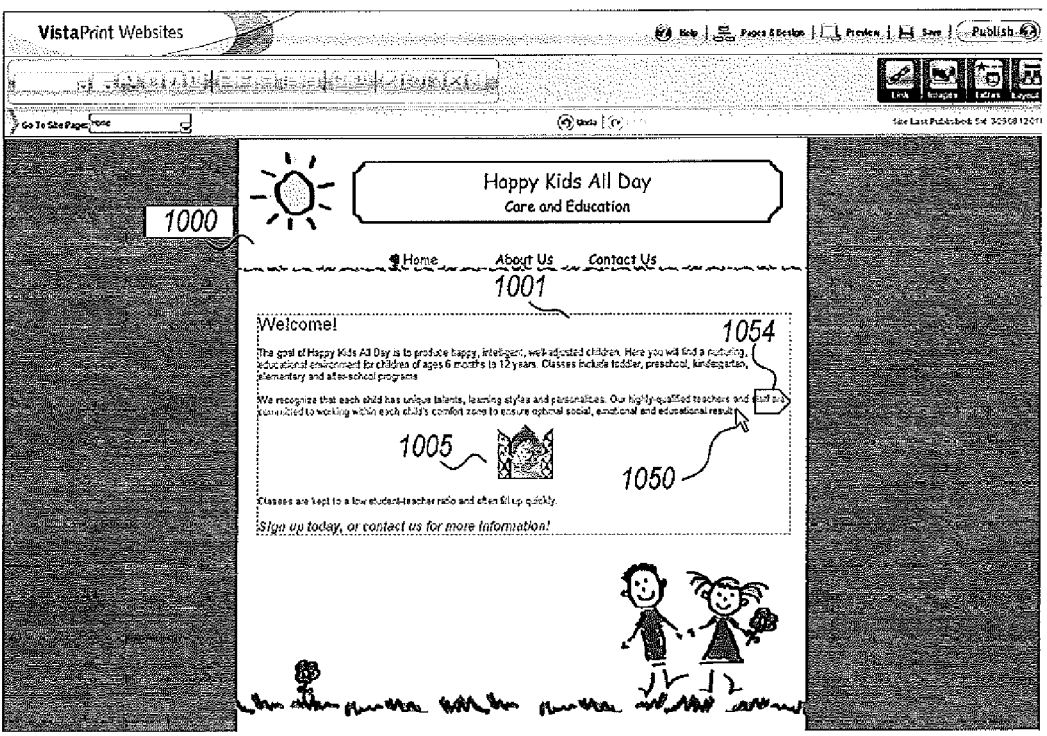
Figure 19:
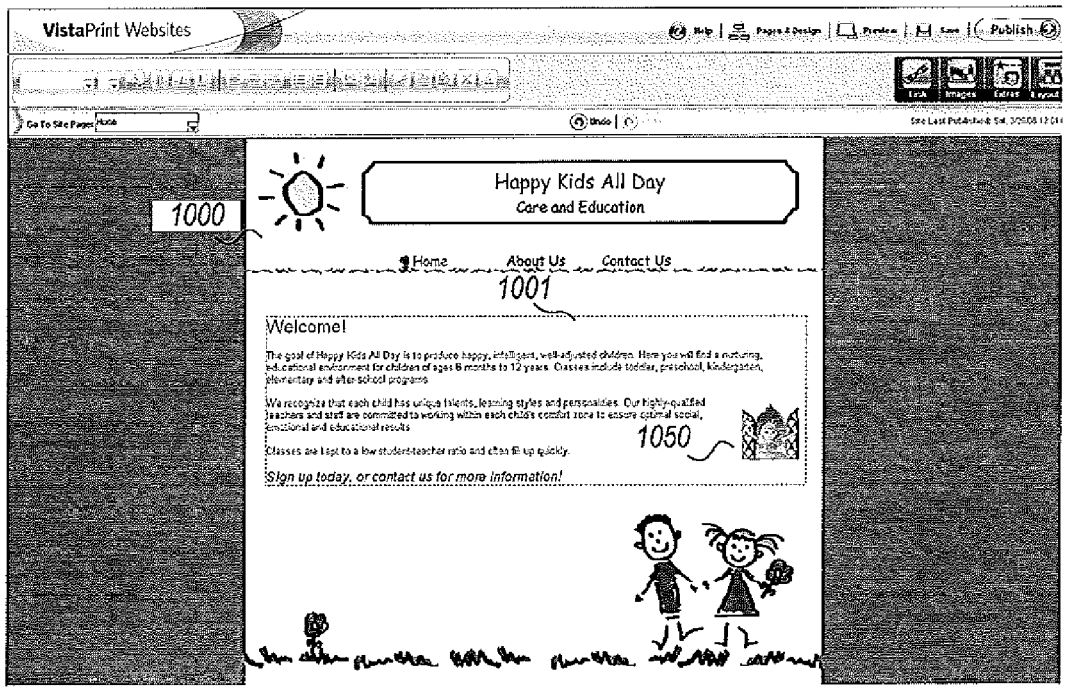

FIG. 18 illustrates the display of a new alignment marker 1054, after activation of the target-alignment-and-drop control 32, as the cursor 1050 is dragged towards the right side of the second text paragraph. As illustrated, the alignment marker 1054 indicates that if the target-alignment-and-drop control 32 is released (by clicking a second time with the mouse), while the cursor is in a position that results in the display of alignment marker 1054, the image object 1005 will be dropped (i.e., inserted) on the right hand side of the second text paragraph. FIG. 19 illustrates the display of the web page 1000 after the user releases the target-alignment-and-drop control 32 to drop the image object 1005 into the position indicated by the alignment marker 1054.

Figure 20:
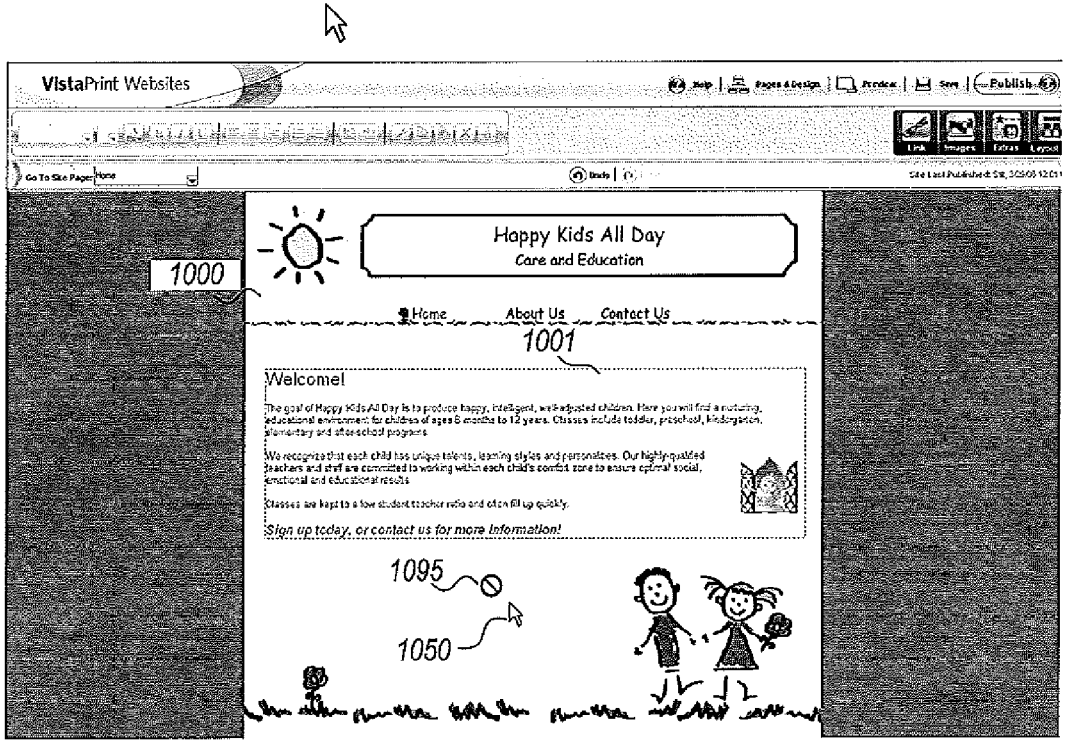

FIG. 20 illustrates the display of an icon 1095 indicating that the area over which the cursor 1050 is positioned is unavailable for dropping the selected image object. The target-alignment-and-drop does not allow the user to drop an image object anywhere on the web page 1000 that is not covered by a valid drop target area. This includes non-editable areas of the web page 1000.

Figure 21:
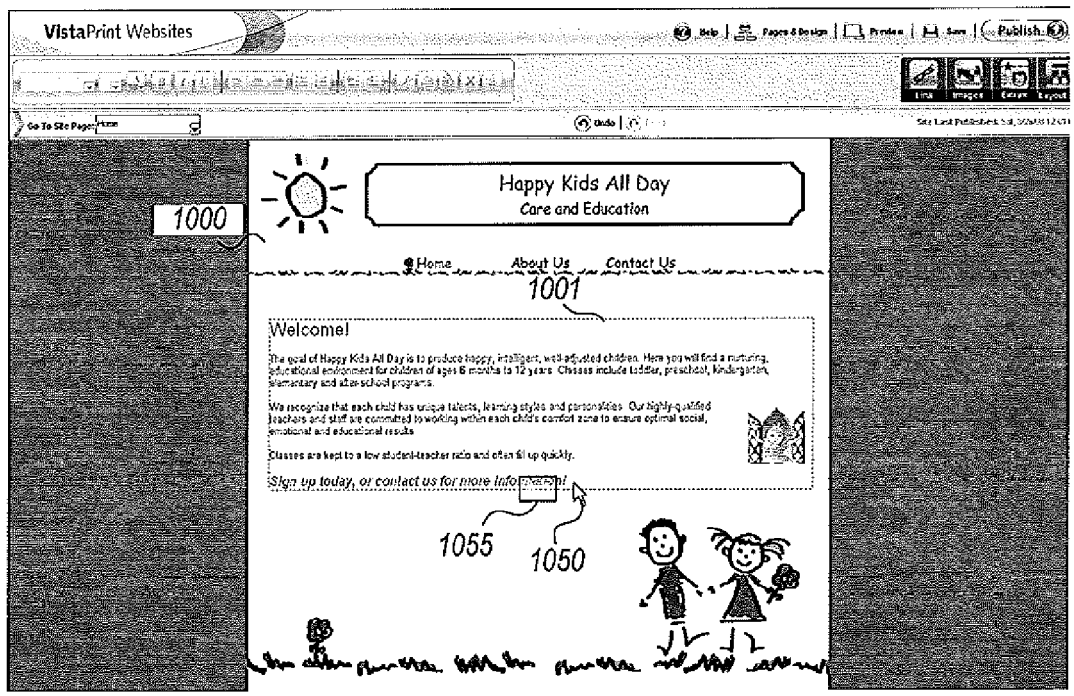
Figure 22:
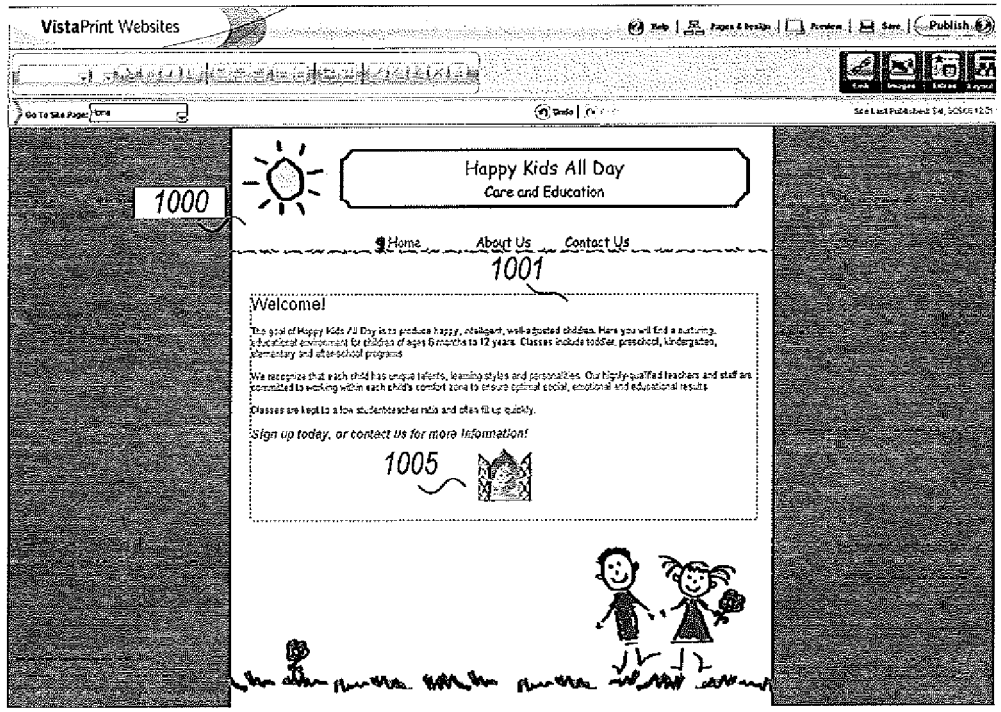

FIG. 21 illustrates the display of a new alignment marker 1055, after activation of the target-alignment-and-drop control 32, as the cursor 1050 is dragged to the bottom of the editable area 1001. As illustrated, the alignment marker 1055 indicates that if the target-alignment-and-drop control 32 is released while the cursor is in a position that results in the display of alignment marker 1055, the image object 1005 will be dropped in the center at the bottom of the editable area 1001. FIG. 22 illustrates the display of the web page 1000 after the user releases the target-alignment-and-drop control 32 to drop the image object 1005 into the position indicated by the alignment marker 1055.

Figure 23:
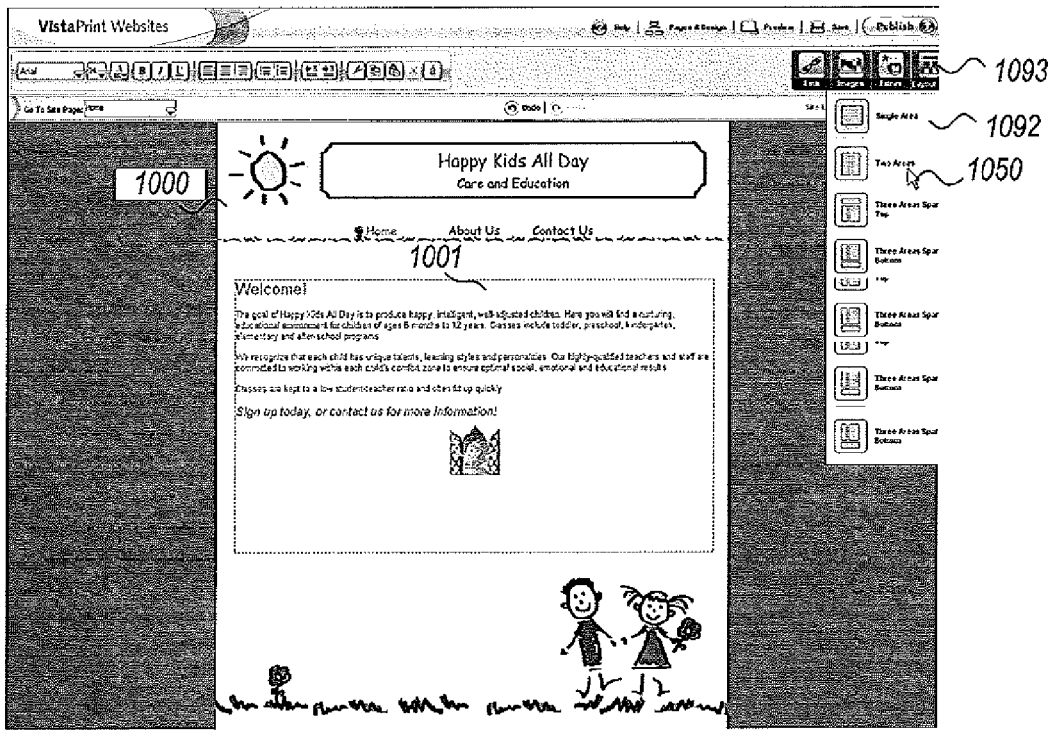
Figure 24:
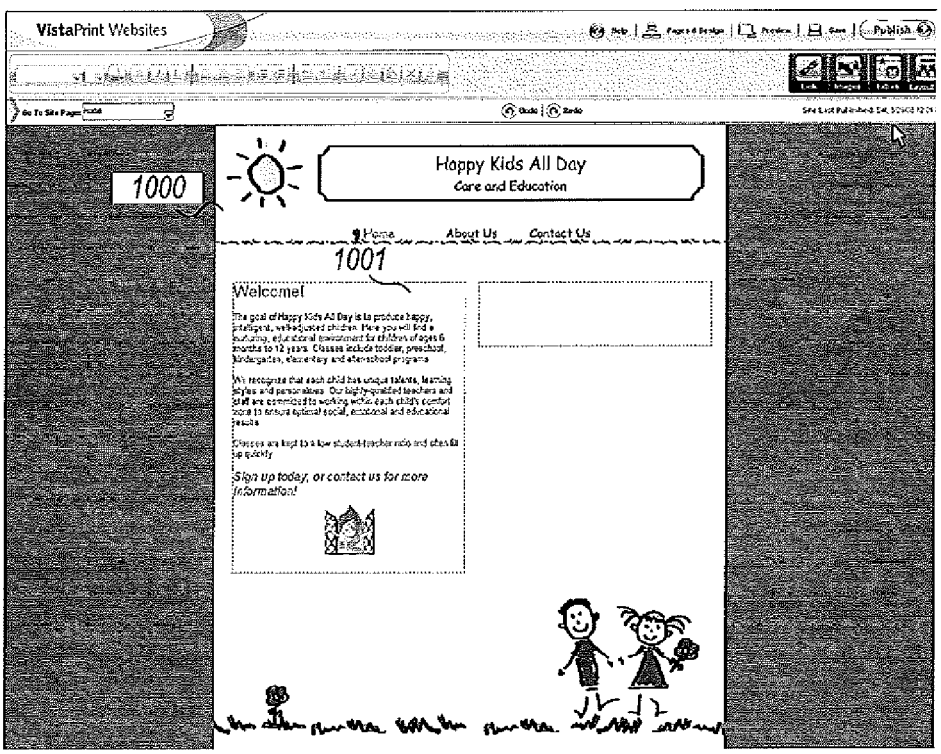

FIG. 23 illustrates layout control drop down list 1092 which is displayed to the user upon activation of the layout button control 1093. The layout control allows the user to select and change the layout of editable text area(s) in the web page 1000. FIG. 24 illustrates the web page 1000 after the user has selected a two-area layout. The resulting layout includes two editable areas arranged as two different editable columns. As illustrated, the text in the first editable area 1001 is reformatted to span the reduced width of the text container. Thus, the vertical dimension of the text container expands to accommodate the increased number of text lines.

Figure 25:
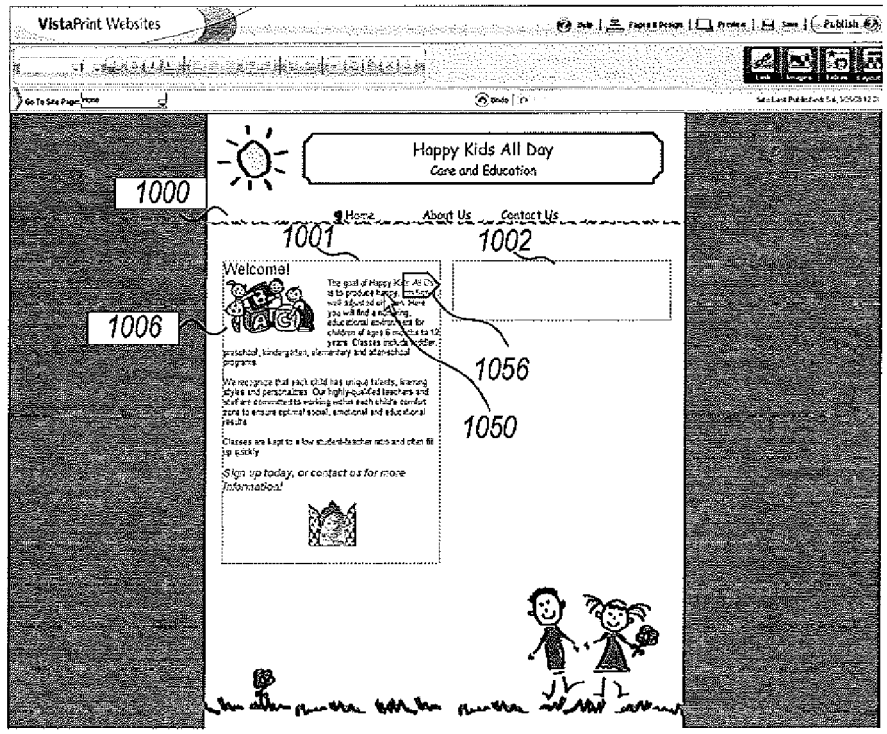
Figure 26:
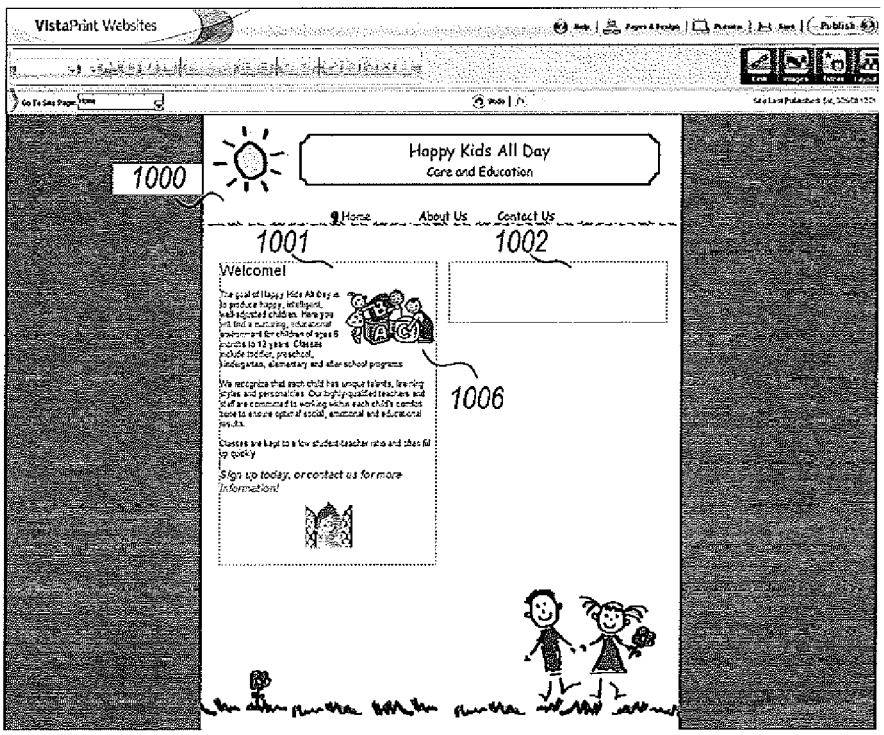

FIG. 25 illustrates the web page 1000 after the user has selected and uploaded another image 1006. Again, by default, the image 1006 is inserted in the text area 1001 in the upper left hand corner of the editable area 1001. FIG. 25 further illustrates the display of a new alignment marker 1056, after activation of the target-alignment-and-drop control 32 with respect to the new image object 1006, as the cursor 1050 is dragged to the right hand side of the first paragraph in the editable area 1001. As illustrated, the alignment marker 1056 indicates that if the target-alignment-and-drop control 32 is released while the cursor is in a position that results in the display of alignment marker 1056, the image object 1006 will be dropped on the right hand side of the first paragraph in the editable area 1001. FIG. 26 illustrates the display of the web page 1000 after the user releases the target-alignment-and-drop control 32 to drop the image object 1006 into the position indicated by the alignment marker 1056.

In summary, as discussed in detail above, the target-alignment-and-drop control 32 enforces rules relating to valid drop target areas and alignment while still allowing the user to make decisions about placement of images and other objects among the editable text of a web page. Importantly, the text paragraphs are not reformatted until the user selects a valid drop target and alignment area by releasing the target-alignment-and-drop control 32. This has the advantage that because the text is not reformatted while the user is dragging the object over various areas of the web page, the valid drop target areas are not moving targets.

While the exemplary embodiments of the invention described herein relate to the editing of web page, the invention is not so limited. The target-alignment-and-drop control 32 may be implemented in any electronic document editing application or environment, including, for example only and without limitation, electronic publishing applications, paperless office applications, internet custom product design tools, etc. In addition, although in the exemplary embodiments described herein the target-alignment-and-drop control 32 is associated with image objects, the target-alignment-and-drop control 32 may be associated with any number of different type of objects that may inserted in an editable area of an electronic document. For example, the target-alignment-and-drop control 32 may be associated with a map object, a form object, a calendar object, a window object, a clock object, or other electronic "widget" objects. Such object may be static (non-editable) or dynamic (editable or otherwise interactive).

While exemplary embodiments of the invention have been discussed, the described embodiment is to be considered as illustrative rather than restrictive. The scope of the invention is as indicated in the following claims and all equivalent methods and systems.

What is claimed is:

1. A computer-implemented method for positioning an object in a region of text in an electronic document, the region of text having one or more predefined valid drop target areas and one or more predefined invalid drop target areas, the method comprising:
   detecting activation of a target-alignment-and-drop control with respect to an object;
   monitoring a position of a cursor as it is dragged from a first position to a second position in the electronic document;
   determining whether the second position is within boundaries of any of the predefined valid drop target areas and selecting a particular one of the predefined valid drop target areas if the second position is within the boundaries of the particular one valid drop target area;
   determining a plurality of different alignment areas for the selected predefined drop target area, each respective alignment area having associated therewith a different set of alignment rules which dictate placement of an object within the selected predefined drop target area for the respective determined alignment area;
   selecting a current alignment area in which the second position is located;
   displaying an alignment indicator which indicates a general position of alignment where the object will be inserted if the target-alignment-and-drop control is released;
   detecting a release of the target-alignment-and-drop control; and
   inserting the object in the selected drop target area such that the object is positioned and aligned within the current alignment area of the selected predefined drop target area according to the alignment rules associated with the current alignment area.

2. The method of claim 1, wherein the object is not inserted in any area of the electronic document until the activated target-alignment-and-drop control is released.

3. The method of claim 1, wherein text in the selected drop target area is reformatted to flow around the inserted object according to alignment rules associated with the selected alignment area.

4. The method of claim 1, wherein the electronic document is a web page being edited.

5. Non-transitory computer readable storage tangibly embodying program instructions which, when executed by a computer, implement a method for positioning an object in a region of text in an electronic document, the region of text having one or more predefined valid drop target areas and one or more predefined invalid drop target areas, the method comprising:
   detecting activation of a target-alignment-and-drop control with respect to an object;
   monitoring a position of a cursor as it is dragged from a first position to a second position in the electronic document;
   determining whether the second position is within boundaries of any of the predefined valid drop target areas and selecting a particular one of the predefined the valid drop target areas if the second position is within the boundaries of the particular one valid drop target area;
   determining a plurality of different alignment areas for the selected predefined drop target area, each respective alignment area having associated therewith a different set of alignment rules which dictate placement of an object within the selected predefined drop target area for the respective determined alignment area;
   selecting a current alignment area in which the second position is located;
   displaying an alignment indicator which indicates a general position of alignment where the object will be inserted if the target-alignment-and-drop control is released;
   detecting a release of the target-alignment-and-drop control; and
   inserting the object in the selected drop target area such that the object is positioned and aligned within the current alignment area of the selected predefined drop target area according to the alignment rules associated with the current alignment area.

6. The non-transitory computer readable storage of claim 1, wherein the object is not inserted in any area of the electronic document until the activated target-alignment-and-drop control is released.

7. The non-transitory computer readable storage of claim 1, wherein text in the selected drop target area is reformatted to flow around the inserted object according to alignment rules associated with the selected alignment area.

8. The non-transitory computer readable storage of claim 1, wherein the electronic document is a web page being edited.

9. A system, comprising:
   input means for receiving user input;
   a display for displaying an editable electronic document; and
   a processor executing computer readable instructions which implement a method for positioning an object in a region of text in the electronic document, the region of text having one or more predefined valid drop target areas and one or more predefined invalid drop target areas, the method including the steps of detecting activation of a target-alignment-and-drop control with respect to an object; monitoring a position of a cursor as it is dragged from a first position to a second position in the electronic document; determining whether the second position is within boundaries of any of the predefined valid drop target areas and selecting a particular one of the predefined valid drop target areas if the second position is within the boundaries of the particular one valid drop target area; determining a plurality of different alignment areas for the selected predefined drop target area, each respective alignment area having associated therewith a different set of alignment rules which dictate placement of an object within the selected predefined drop target area for the respective determined alignment area; selecting a current alignment area in which the second position is located; displaying an alignment indicator which indicates a general position of alignment where the object will be inserted if the target-alignment-and-drop control is released; detecting a release of the target-alignment-and-drop control; and inserting the object in the selected drop target area such that the object is positioned and aligned within the current alignment area of the selected predefined drop target area according to the alignment rules associated with the current alignment area.

10. The system of claim 9, wherein the object is not inserted in any area of the electronic document until the activated target-alignment-and-drop control is released.

11. The system of claim 9, wherein text in the selected drop target area is reformatted to flow around the inserted object according to alignment rules associated with the selected alignment area.

12. The system of claim 9, wherein the electronic document is a web page being edited.

* * * * *